(12) United States Patent
Balasubramanian et al.

(10) Patent No.: US 12,273,709 B2
(45) Date of Patent: Apr. 8, 2025

(54) DERIVING PHYSICAL LAYER KEYS FOR SECURE SIDELINK COMMUNICATION

(71) Applicant: QUALCOMM Incorporated, San Diego, CA (US)

(72) Inventors: Anantharaman Balasubramanian, San Diego, CA (US); Kapil Gulati, Belle Mead, NJ (US); Shijun Wu, San Diego, CA (US); Hong Cheng, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 17/811,228

(22) Filed: Jul. 7, 2022

(65) Prior Publication Data

US 2024/0015504 A1     Jan. 11, 2024

(51) Int. Cl.
*H04W 12/041* (2021.01)
*H04B 17/318* (2015.01)
*H04W 12/0471* (2021.01)
*H04W 12/63* (2021.01)

(52) U.S. Cl.
CPC ........ *H04W 12/041* (2021.01); *H04B 17/318* (2015.01); *H04W 12/0471* (2021.01); *H04W 12/63* (2021.01)

(58) Field of Classification Search
None
See application file for complete search history.

(56) References Cited

U.S. PATENT DOCUMENTS

| | | | |
|---|---|---|---|
| 2009/0141900 A1* | 6/2009 | Ye | H04L 9/0875 380/270 |
| 2012/0314866 A1* | 12/2012 | Horneman | H04W 12/041 380/270 |
| 2014/0112474 A1 | 4/2014 | Escott et al. | |
| 2018/0013558 A1* | 1/2018 | Hassan | H04L 9/0861 |
| 2020/0267545 A1* | 8/2020 | Chang | H04W 12/04 |
| 2024/0244426 A1* | 7/2024 | Kunz | H04W 12/041 |

OTHER PUBLICATIONS

International Search Report and Written Opinion—PCT/US2023/069289—ISA/EPO—Sep. 25, 2023.
Sun J., et al., "SYNERGY: A Game-Theoretical Approach For Cooperative Key Generation in Wireless Networks", IEEE Infocom 2014—IEEE Conference on Computer Communications, IEEE, Apr. 27, 2014, pp. 997-1005, XP032613408, DOI: 10.1109/INFOCOM.2014.6848029, p. 998-p. 1004.

* cited by examiner

*Primary Examiner* — Joshua Joo
(74) *Attorney, Agent, or Firm* — Harrity & Harrity, LLP

(57) ABSTRACT

Various aspects of the present disclosure generally relate to wireless communication. In some aspects, a first user equipment (UE) may receive, from a network node, an indication of first level shared information, that is shared between at least the first UE and a second UE, for deriving a security key from common sidelink information. The first UE may determine second level shared information, that is shared between the first UE and the second UE, for deriving the security key from the common sidelink information. The first UE may communicate with the second UE using the security key derived from the common sidelink information based at least in part on the first level shared information and the second level shared information. Numerous other aspects are described.

30 Claims, 13 Drawing Sheets

DERIVING PHYSICAL LAYER KEYS FOR SECURE SIDELINK COMMUNICATION

FIELD OF THE DISCLOSURE

Aspects of the present disclosure generally relate to wireless communication and to techniques and apparatuses for deriving physical layer keys for secure sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first user equipment (UE) for wireless communication. The first UE may include a memory and one or more processors coupled to the memory. The one or more processors may be configured to receive, from a network node, an indication of first level shared information, that is shared between at least the first UE and a second UE, for deriving a security key from common sidelink information. The one or more processors may be configured to determine second level shared information, that is shared between the first UE and the second UE, for deriving the security key from the common sidelink information. The one or more processors may be configured to communicate with the second UE using the security key derived from the common sidelink information based at least in part on the first level shared information and the second level shared information.

Some aspects described herein relate to a method of wireless communication performed by a first UE. The method may include receiving, from a network node, an indication of first level shared information, that is shared between at least the first UE and a second UE, for deriving a security key from common sidelink information. The method may include determining second level shared information, that is shared between the first UE and the second UE, for deriving the security key from the common sidelink information. The method may include communicating with the second UE using the security key derived from the common sidelink information based at least in part on the first level shared information and the second level shared information.

Some aspects described herein relate to a non-transitory computer-readable medium that stores a set of instructions for wireless communication by a first UE. The set of instructions, when executed by one or more processors of the first UE, may cause the first UE to receive, from a network node, an indication of first level shared information, that is shared between at least the first UE and a second UE, for deriving a security key from common sidelink information. The set of instructions, when executed by one or more processors of the first UE, may cause the first UE to determine second level shared information, that is shared between the first UE and the second UE, for deriving the security key from the common sidelink information. The set of instructions, when executed by one or more processors of the first UE, may cause the first UE to communicate with the second UE using the security key derived from the common sidelink information based at least in part on the first level shared information and the second level shared information.

Some aspects described herein relate to an apparatus for wireless communication. The apparatus may include means for receiving, from a network node, an indication of first level shared information, that is shared between at least the apparatus and a UE, for deriving a security key from common sidelink information. The apparatus may include means for determining second level shared information, that is shared between the apparatus and the UE, for deriving the security key from the common sidelink information. The apparatus may include means for communicating with the UE using the security key derived from the common sidelink information based at least in part on the first level shared information and the second level shared information.

Some aspects described herein relate to a method of wireless communication performed by a network node. The method may include transmitting, to at least a first UE and a second UE, an indication of first level shared information for deriving a security key from common sidelink information.

Some aspects described herein relate to a network node for wireless communication. The network node may include a memory and one or more processors coupled to the memory. The one or more processors may be configured to transmit, to at least a first UE and a second UE, an indication of first level shared information for deriving a security key from common sidelink information.

Some aspects described herein relate to a non-transitory computer-readable medium that stores a set of instructions for wireless communication by a network node. The set of instructions, when executed by one or more processors of the network node, may cause the network node to transmit, to at least a first UE and a second UE, an indication of first level shared information for deriving a security key from common sidelink information.

Some aspects described herein relate to an apparatus for wireless communication. The apparatus may include means for transmitting, to at least a first UE and a second UE, an indication of first level shared information for deriving a security key from common sidelink information. The apparatus may include means for transmitting, to the first UE and the second UE, an indication of second level shared information for deriving the security key from the common sidelink information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
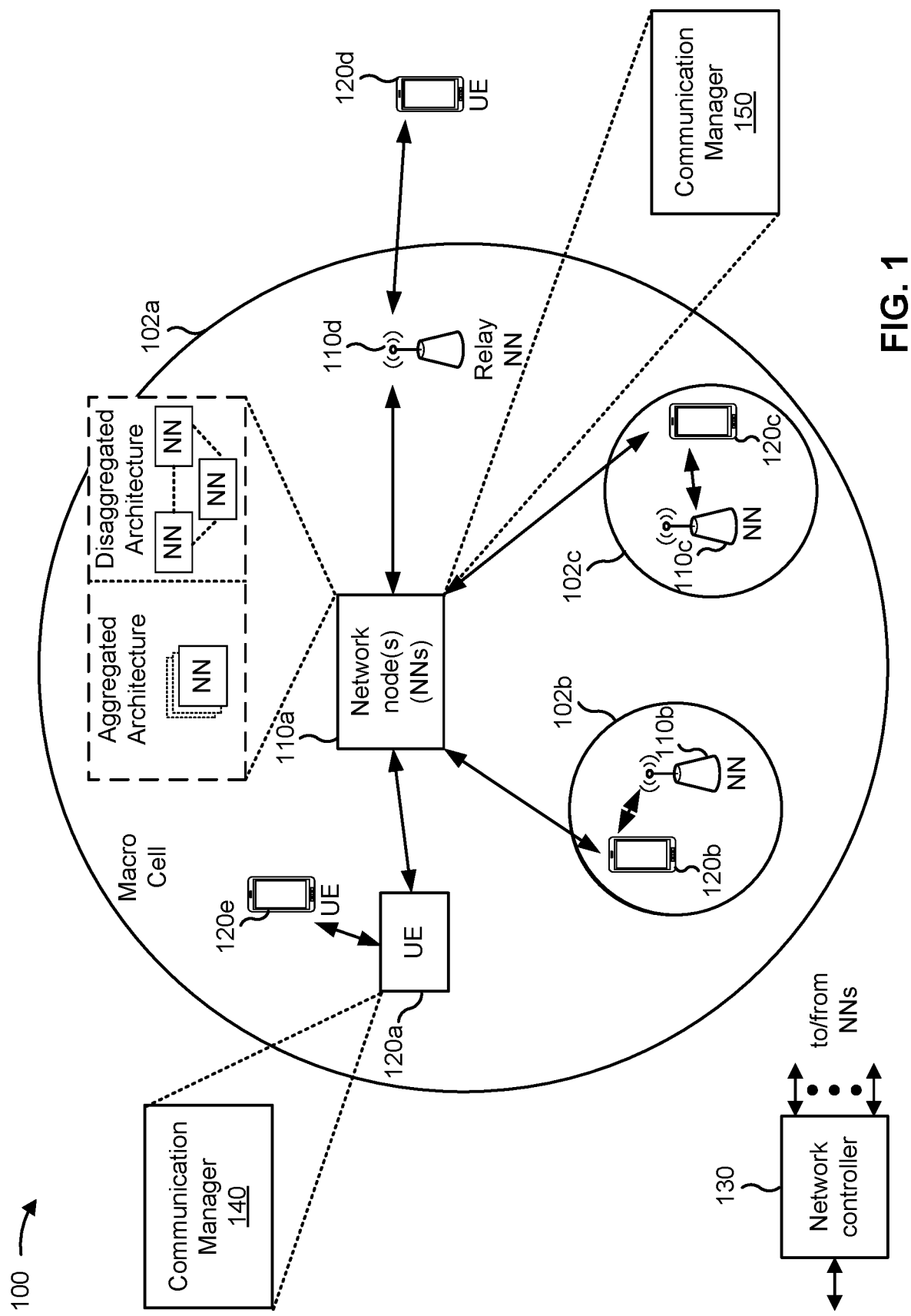
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 of a first UE may receive, from a network node, an indication of first level shared information, that is shared between at least the first UE and a second UE, for deriving a security key from common sidelink information; determine second level shared information, that is shared between the first UE and the second UE, for deriving the security key from the common sidelink information; and communicate with the second UE using the security key derived from the common sidelink information based at least in part on the first level shared information and the second level shared information. Additionally, or alternatively, the communication manager 140 may perform one or more other operations described herein.

In some aspects, the network node 110 may include a communication manager 150. As described in more detail elsewhere herein, the communication manager 150 may transmit, to at least a first UE and a second UE, an indication of first level shared information for deriving a security key from common sidelink information. In some aspects, the communication manager 150 may also transmit, to the first UE and the second UE, second level shared information for deriving the security key from the common sidelink information. Additionally, or alternatively, the communication manager 150 may perform one or more other operations described herein.

As indicated above, FIG. 1 is provided as an example. Other examples may differ from what is described with regard to FIG. 1.

Figure 2:
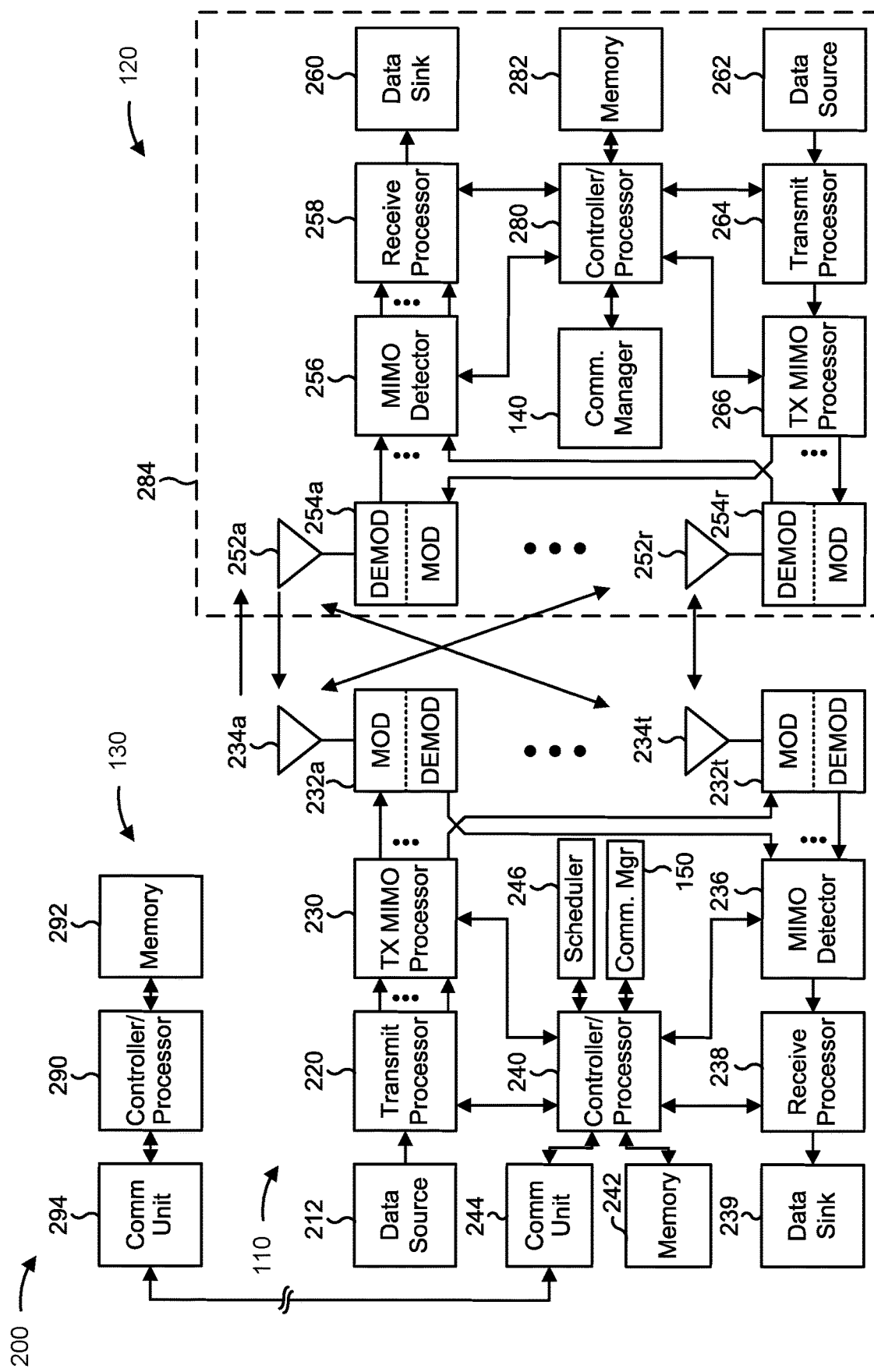
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the network node 110, the controller/processor 280 of the UE 120, and/or any other component(s) of FIG. 2 may perform one or more techniques associated with deriving physical layer keys for secure sidelink communication, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node, an indication of first level shared information, that is shared between at least the UE and a second UE, for deriving a security key from common sidelink information; means for determining second level shared information, that is shared between the UE and the second UE, for deriving the security key from the common sidelink information; and/or means for communicating with the second UE using the security key derived from the common sidelink information based at least in part on the first level shared information and the second level shared information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, to at least a first UE and a second UE, an indication of first level shared information for deriving a security key from common sidelink information; and/or means for transmitting, to the first UE and the second UE, second level shared information for deriving the security key from the common sidelink information. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
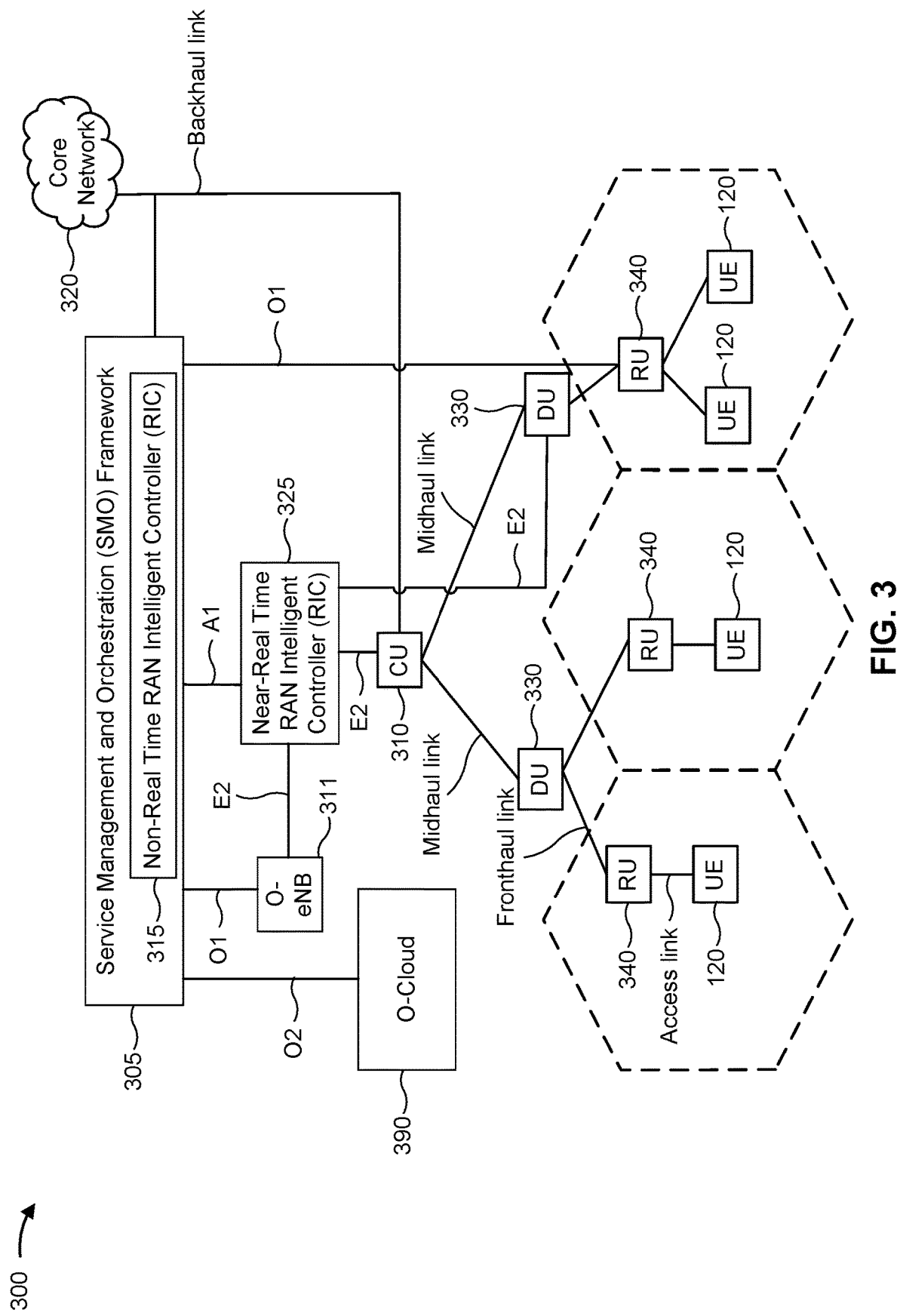
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
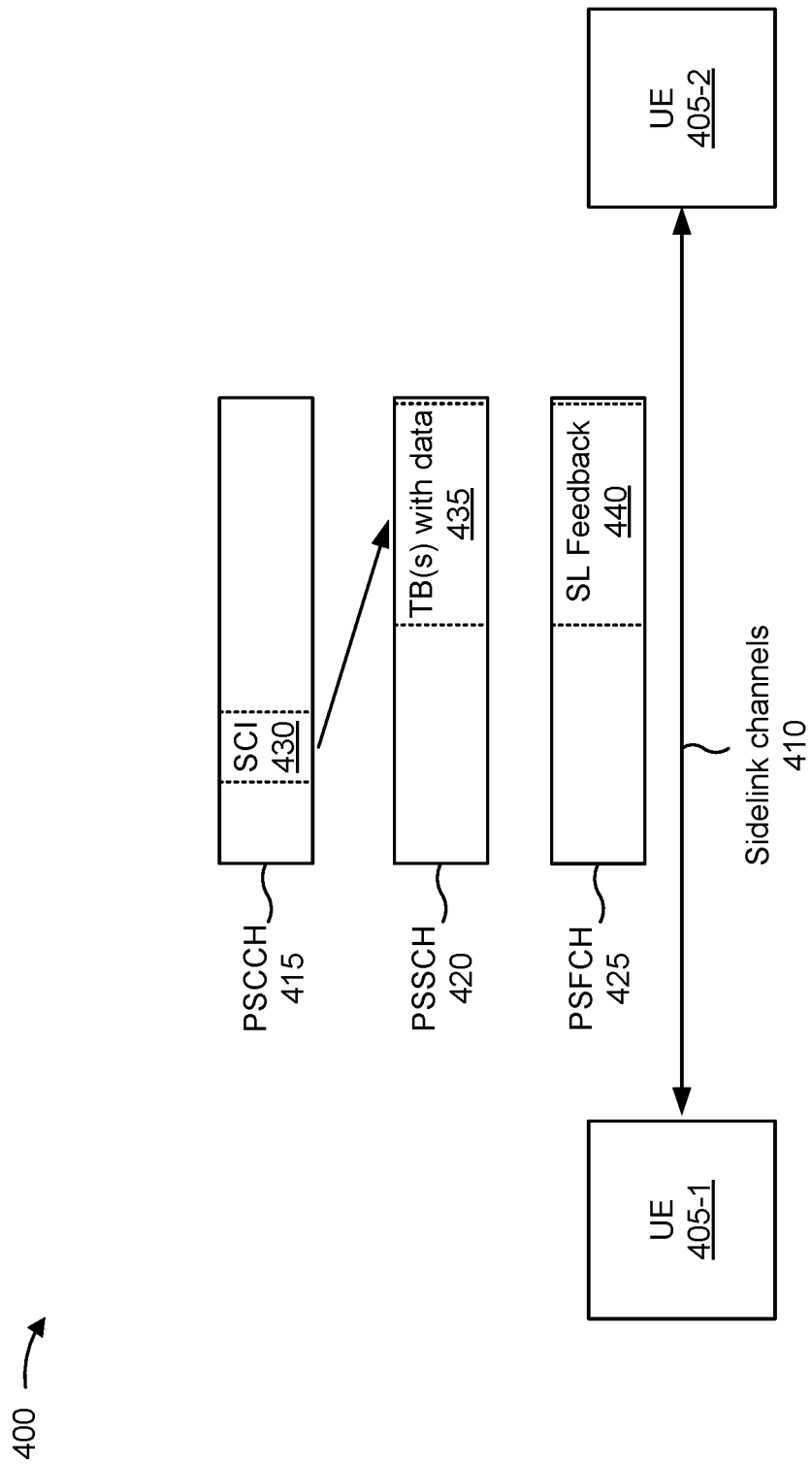
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a channel state information (CSI) report trigger.

Some fields in the SCI-1 and/or the SCI-2 may be designated as common information, and some fields in the SCI-1 and/or the SCI-2 may be designated as private information. Common information is applicable for all legitimate sidelink UEs in a wireless communication network, and private information is applicable only for UEs that are taking part in a particular sidelink communication session (e.g., a unicast sidelink communication session, a connected groupcast sidelink communication session, and/or a connectionless groupcast sidelink communication session, among other examples).

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110. For example, the UE 405 may receive a grant (e.g., in downlink control information (DCI) or in an RRC message, such as for configured grants) from the network node 110 for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
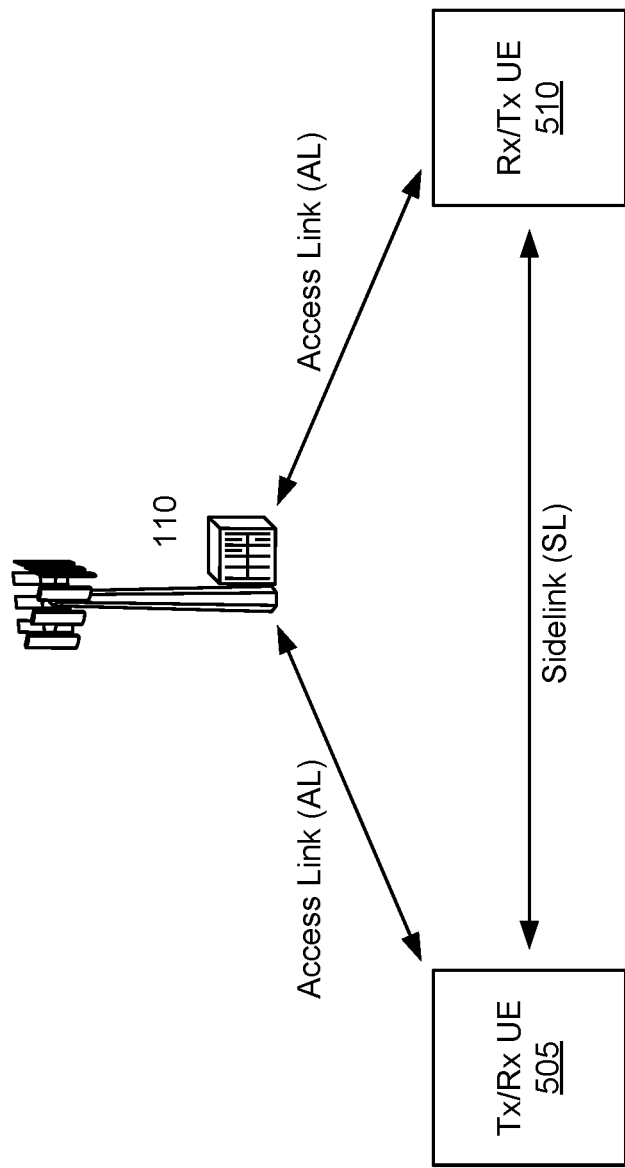
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 via a first access link. Additionally, or alternatively, in some sidelink modes, the network node 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 5 is provided as an example. Other examples may differ from what is described with respect to FIG. 5.

Figure 6:
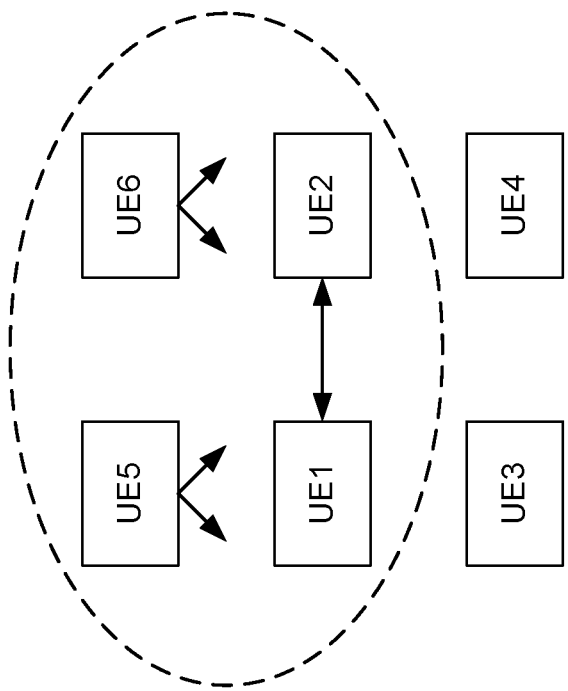
FIG. 6 is a diagram illustrating an example of sidelink communications between two UEs in a vicinity of other UEs, in accordance with the present disclosure.

FIG. 6 is a diagram illustrating an example 600 of sidelink communications between two UEs in a vicinity of other UEs, in accordance with the present disclosure. As shown in FIG. 6, example 600 includes a first UE (UE1), a second UE (UE2), a third UE (UE3), a fourth UE (UE4), a fifth UE (UE5), and sixth UE (UE6).

Security for communications (e.g., access link communications and/or sidelink communications) in a wireless communication network may be enabled at different layers in the protocol stack (e.g., a PHY layer, a MAC layer, a PDCP layer, an RRC layer, and/or a non-access stratum (NAS) layer, among other examples). However existing security methods in 5G/NR (e.g., in a current 3GPP wireless communication standard) focus more on upper layer (e.g., PDCP layer) security than on lower layer (e.g., PHY layer) security. Currently, PHY layer security is not provided for SCI. Thus, SCI is not protected and is vulnerable to attacks at the PHY layer. As a result, UEs, other than the intended UE(s) taking part in a communication session, may be able to access private information included in SCI (e.g., SCI-1 and/or SCI-2). Furthermore, PHY layer security is not currently provided for sidelink communications used for sidelink ranging, and such sidelink communications may be subject to attack at the PHY layer.

A network (e.g., a network node) and a UE may derive different keys at different layers (e.g., the NAS layer, the RRC layer, and/or the PDCP layer) in order to provide security for access link (e.g., downlink and/or uplink) communications between the network and the UE. In some examples, a symmetrical key derivation approach may be to ensure that the network and the UE derive the same keys. For example, the network and the UE may use an authentication and key agreement (AKA) procedure to perform the symmetric key derivation based on pre-shared secret information. However, the AKA procedure used for symmetrical key derivation for access link communications may not be effective for sidelink communications because a UE may not have a fixed peer UE for the security setup. Furthermore, in the case of sidelink communications, peer UEs may not have pre-shared secret information that is used as a basis for the AKA procedure.

In some aspects, UEs may derive a security key (e.g., a PHY layer security key) to secure sidelink communications between the UEs from common sidelink information (e.g., common information included in SCI-1, SCI-2, and/or the PSSCH) transmitted by other UEs. For example, as shown in FIG. 6, UE1 may communicate with UE2, and UE1 and UE2 may be in a vicinity of other UEs (e.g., UE3-U6). Some of the other UEs may be in the communication range of UE1 but not UE2. Some of the other UEs may be in the communication range of UE2 but not UE1. Some of the other UEs (e.g., UE5 and U6 in FIG. 6) may be in the communication range of both UE1 and UE2. In some aspects, UE1 and UE2 may derive a shared security key based at least in part on common sidelink information transmitted by one or more of the other UEs. In this case, UE1 and UE2 may use the security key to protect private fields in SCI transmitted between UE1 and UE2. In some aspects, common sidelink information transmitted by UE5 and UE6 (e.g., the UEs in the communication range of both UE1 and UE2) may be available to both UE1 and UE2, and UE1 and UE2 may exploit this common sidelink information to derive the security key. However, it may not be clear to UE1 and UE2 which UE(s) (e.g., UE5, UE6, or both UE5 and UE6) to use as a source for the common sidelink information to be used to derive the security key. Furthermore, UE1 and UE2 may not be aware of what common sidelink information (e.g., which fields in the available common sidelink information) to use to derive the security key.

In some aspects, UEs (e.g., UE3 and UE4) that do not have a prior association may derive a shared security key from common sidelink information transmitted by other UEs (e.g., UE1, UE2, UE5, and/or UE6), and the UEs (e.g., UE3 and UE4) may use the security key perform secure sidelink ranging. However, the UEs may not be aware of which common sidelink information to use to derive the security key and which other UE(s) to use as the source for the common sidelink information to be used to derive the security key.

Some techniques and apparatuses described herein enable a first UE to receive, from a network node, an indication of first level shared information, that is shared between at least the first UE and a second UE, for deriving a security key from common sidelink information. The first UE may determine second level shared information, that is shared between the first UE and the second UE, for deriving the security key from the common sidelink information. The first UE may communicate with the second UE using the security key derived from the common sidelink information based at least in part on the first level shared information and the second level shared information. In some aspects, the first level shared information may indicate a set of fields in the common sidelink information and a set of bits in the set of fields to be used for deriving the security key. In some aspects, the second level shared information may indicate one or more UEs from which to receive the common sidelink information to be used for deriving the security key (or one or more subchannels on which to receive the common sidelink information to be used for deriving the security key). As a result, the first UE and the second UE may each use the same common sidelink information to derive a shared security key that may be used to provide PHY layer security for sidelink communications between the first UE and the second UE. For example, the first UE and/or the second UE may use the derived security key to provide PHY layer security for private information in SCI transmitted between the first UE and the second UE and/or to provide PHY layer security for sidelink communications associated with sidelink ranging.

As indicated above, FIG. 6 is provided as an example. Other examples may differ from what is described with respect to FIG. 6.

Figure 7:
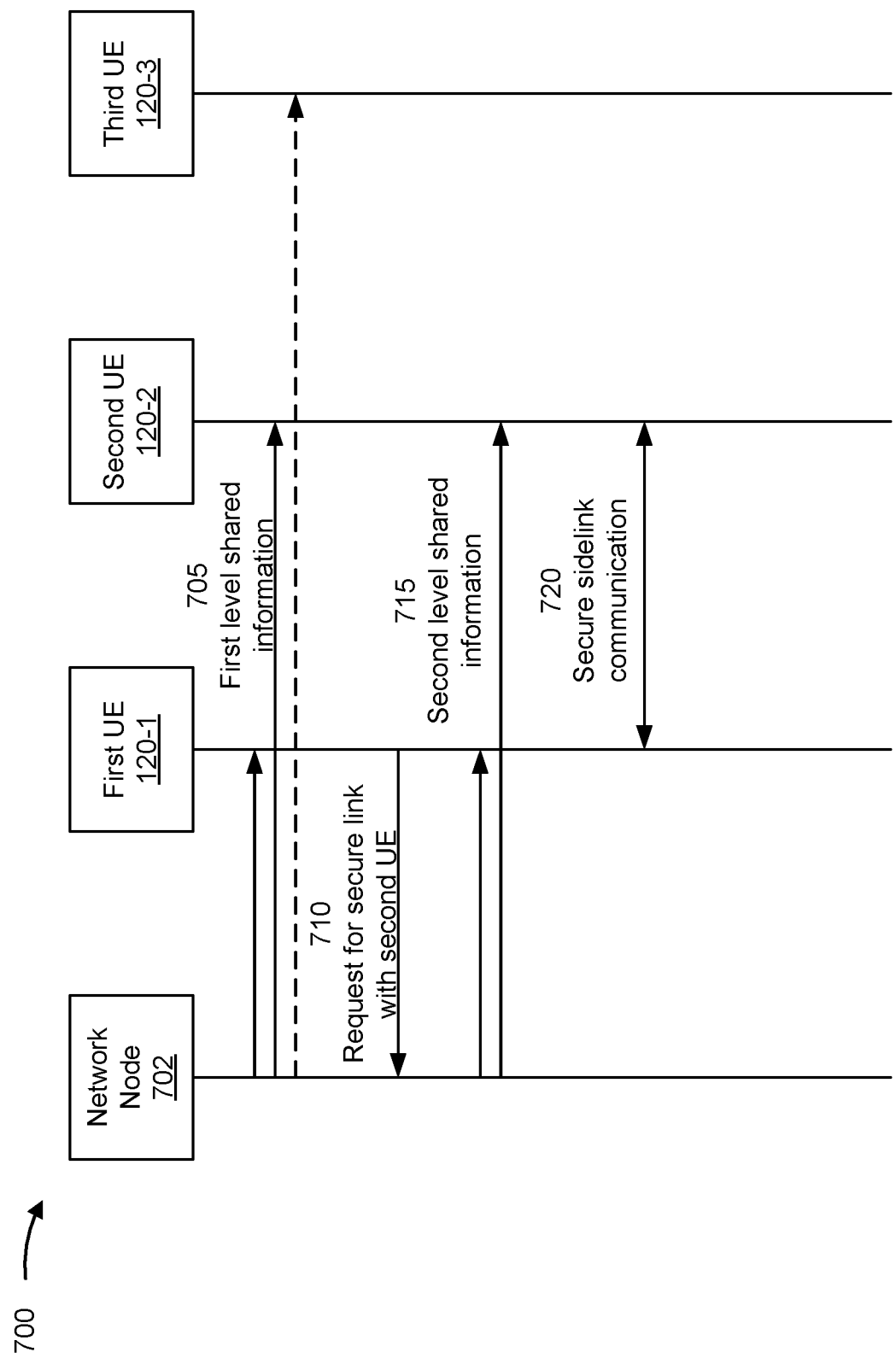
FIGS. 7-9 are diagrams illustrating examples associated with deriving physical layer keys for secure sidelink communications, in accordance with the present disclosure.

FIG. 7 is a diagram illustrating an example 700 associated with deriving physical layer keys for secure sidelink communication, in accordance with the present disclosure. As shown in FIG. 7, example 700 includes a network node 702, a first UE 120-1, a second UE 120-2, and a third UE 120-3. In some aspects, the network node 702 and the UEs 120 (e.g., the first UE 120-1, the second UE 120-2, and the third UE 120-3) may be included in a wireless network, such as wireless network 100. In some aspects, the network node 702 may correspond to one or more network nodes described elsewhere herein, such as network node 110. In some aspects, the network node 702 may be a roadside unit (RSU).

As shown in FIG. 7, and by reference number 705, the network node 702 may transmit, to at least the second UE 120-1 and the second UE 120-2, an indication of first level shared information. The first UE 120-1 and the second UE 120-2 may each receive the indication of the first level shared information. In some aspects, the network node 702 may also transmit the first level shared information to the third UE 120-3 and/or one or more other UEs in a cell associated with the network node 702. In this case, the third UE 120-3 and/or the one or more other UEs in the cell may receive the first level shared information.

The first level shared information may be information shared between at least the first UE 120-1 and the second UE 120-2 to be used (by the UEs), together with second level shared information, to derive a security key (e.g., a PHY layer security key) from common sidelink control information transmitted by one or more other UEs. The first level shared information may indicate a first level shared secret between at least the first UE 120-1 and the second UE 120-2. In some aspects, the first level shared information may indicate which fields, and how many bits in each field, of common sidelink information are to be used by the UEs 120 (e.g., the first UE 120-1 and the second UE 120-2) for deriving/constructing the security key from the common sidelink information transmitted (e.g., broadcast) by one or more other UEs. The common sidelink information may include common information in SCI (e.g., SCI-1 and/or SCI-2) and/or sidelink data transmitted by a UE. The first level shared information may indicate a set of fields in the common sidelink information and a set of bits in the set of fields to be used for deriving the security key. For example, the first level shared information may indicate N fields ($f_1$, $f_2$, ..., $f_N$) of the sidelink control or data information, and a respective set of bits $\{c_i\}$ in each field $f_i$ to be used to derive the security key. In some aspects, a derived key $d_k$, derived from common sidelink information from a source UE k, may be defined by concatenation of $[\{c_1\}, \{c_2\}, ..., \{c_N\}]$.

In some aspects, the first level shared information may indicate fields of the common sidelink information, and bits within the fields, to be used for deriving a security key on a per-slot basis. For example, the first level shared information may indicate the following fields (and bits) to be used, on a per-slot basis for deriving the security key: $c_1$=[bit1, bit3] of the HARQ process number from SCI-2; $c_2$=[bit1, bit10, bit 14] of the destination ID from SCI-2; $c_3$=[bit3, bit4] of the MCS from SCI-1; and $c_4$=[bit1 through bit10] of the sidelink data decoded from the PSSCH. In this case, a derived key $d_k$, derived from common sidelink information from a source UE k, may be denoted as $d_k$=[$c_1$, $c_2$, $c_3$, $c_4$].

In some aspects, the network node 702 may configure the first level shared information for the first UE 120-1, the second UE 120-2, and/or other UEs in the cell (e.g., the third UE 120-3) on a semi-static basis. For example, the network node 702 may transmit the indication of the first level shared information to the first UE 120-1, the second UE 120-2, the third UE 120-3, and/or one or more other UEs in an RRC message. Additionally, or alternatively, the network node 702 may transmit the first level shared information to the UEs 120 in a MAC control element (MAC-CE) or DCI.

In some aspects, the first level shared information may be shared by all UEs in a cell associated with the network node 702. In this case, the network node 702 may transmit the first level shared information to all UEs in the cell. For example, the network node 702 may transmit the first level shared information to the first UE 120-1, the second UE 120-2, the third UE 120-3, and any other UEs in the cell. In this case, by transmitting the first level shared information to all UEs in the cell, the network node 702 may configure a common sidelink based key for all UEs in the cell.

In some aspects, the first level shared information may be shared only between UEs involved in establishing a secure link. For example, the first level shared information may be shared only between the first UE 120-1 and the second UE 120-2. In this case, the network node 702 may transmit the first level shared information only to the first UE 120-1 and the second UE 120-2. In some aspects, the network node 702 may transmit the first level shared information to the first UE 120-1 and the second UE 120-2 in connection with a secure link being established between the first UE 120-1 and the second UE 120-2. For example, the first UE 120-1 may transmit, to the network node 702, a request to establish a secure link for sidelink communication with the second UE 120-2, and the network node 702 may transmit the first level shared information to the first UE 120-1 and the second UE 120-2 based at least in part on receiving the request to establish a secure link between the first UE 120-1 and the second UE 120-2.

As further shown in FIG. 7, and by reference number 710, the first UE 120-1 may transmit, to the network node 702, a request for a secure link with the second UE 120-2. The network node 702 may receive the request for the secure link between the first UE 120-1 and the second UE 120-2. In some aspects, the request may be a request to establish a secure link for secure sidelink communication between the first UE 120-1 and the second UE 120-2. In some aspects, the first UE 120-1 may transmit the request via an RRC message, a MAC-CE, or uplink control information (UCI).

As further shown in FIG. 7, and by reference number 715, the network node 702 may transmit, to the first UE 120-1 and the second UE 120-2, second level shared information to be used for deriving the security key. The first UE 120-1 and the second UE 120-2 may each receive the second level shared information. For example, the network node 702 may transmit the second level shared information via an RRC message, a MAC-CE, or DCI. The second level shared information may be information to be used (e.g., by the first UE 120-1 and the second UE 120-2), together with the first level shared information, to derive the security key from the common sidelink information transmitted by one or more other UEs.

In some aspects, the second level shared information may indicate which one or more other UEs are to be used (by the first UE 120-1 and the second UE 120-2) as sources (e.g., source UEs) for the common sidelink information from which the security key is to be derived. For example, the second level shared information may indicate, to the first UE 120-1 and the second UE 120-2, one or more UEs (e.g., one or more source UEs) from which to receive the common sidelink information to be used for deriving the security key. This may allow the first UE 120-1 and the second UE 120-2 to derive the same security key based at least in part on the first level shared information and the second level shared information. In some aspects, the first UE 120-1 and the second UE 120-2 may each derive the security key, on a per-slot basis, from the set of bits in the set of fields (indicated by the first level shared information) in the common sidelink information received from the one or more UEs (indicated by the second level shared information). For example, in a case in which the second level shared information indicates a set of source UEs $\{k_1, k_2, k_3\}$, the first UE 120-1 and the second UE 120-2 may derive the security key, for a sidelink communication in a slot, as $K=[d_{k_1}, d_{k_2}, d_{k_3}]$ (e.g., by concatenating respective derived keys constructed (in accordance with the first level shared information) from the common sidelink information transmitted by the indicated source UEs in the slot). In some aspects, the second level shared information may also indicate an order of the source UEs (e.g., an order for concatenating the bits extracted from the common sidelink information received from the source UEs).

In some aspects, the second level shared information may indicate one or more subchannels on which to receive the common sidelink information to be used for deriving the security key. For example, the network node 702 may transmit, to the first UE 120-1 and the second UE 120-2, an indication of the one or more subchannels on which to receive the common sidelink information to be used for deriving the security key. In this case, the first UE 120-1 and the second UE 120-2 may each derive the security key, on a per-slot basis, from the set of bits in the set of fields (indicated by the first level shared information) in the common sidelink information transmitted (e.g., by one or more other UEs) on the one or more subchannels indicated by the second level shared information. For example, the first UE 120-1 and the second UE 120-2 may derive the security key by concatenating the set of bits in the set of fields in the common sidelink information received on the one or more subchannels indicated by the second level shared information. In some aspects, the second level shared information may also indicate an order of the subchannels (e.g., an order for concatenating the bits extracted from the common sidelink information received on the indicated subchannels).

In some aspects, the network node 702 may transmit the second level shared information to the first UE 120-1 and the second UE 120-2 based at least in part on receiving the request for the secure link between the first UE 120-1 and the second UE 120-2. In some aspects, in a case in which the first level shared information is shared with all of the UEs in the cell, the network node 702 may transmit the second level shared information (e.g., the indication of the one or more source UEs and/or the one or more subchannels) using respective secure communications via the Uu interface to the first UE 120-1 and the second UE 120-2. In some aspects, in a case in which the first level shared information is shared only between the first UE 120-1 and the second UE 120-2, the indication of the second level shared information, transmitted by the network node 702, may not be secured. For example, in this case, the network node 702 may transmit the second level shared information (e.g., the indication of the one or more source UEs and/or the one or more sub channels) using clear (e.g., unencrypted) text.

As further shown in FIG. 7, and by reference number 720, the first UE 120-1 and the second UE 120-2 may communicate, via a secure sidelink communication, using the security key derived based at least in part on the first level shared information and the second level shared information. The security key may be a sequence of bits extracted from the common sidelink information transmitted by one or more other UEs (e.g., the one or more source UEs) based at least in part on the first level shared information and the second level shared information. The first UE 120-1 and the second UE 120-2 may derive the security key independently, with respect to each other, based at least in part on the first level shared information and the second level shared information.

In some aspects, the first UE 120-1 may transmit, and the second UE 120-2 may receive, the secure sidelink communication. In this case, the first UE 120-1 may derive the security key, for the sidelink communication in a slot, from the common sidelink information transmitted in the slot by one or more other UEs based at least in part on the first level shared information and the second level shared information. Alternatively, the first UE 120-1 may derive the security, for the sidelink communication in a slot, from the common sidelink information transmitted in a previous slot with respect to the current slot, such as an immediately preceding slot or a slot offset with a certain offset to the current slot. The first UE 120-1 may then use the derived security key to provide security for the sidelink communication transmitted from the first UE 120-1 to the second UE 120-2. For example, the first UE 120-1 may encrypt or encode private information in the SCI (e.g., SCI-1 and/or SCI-2) and/or the sidelink data included in the sidelink communication. Additionally, or alternatively, the first UE 120-1 may include, in the sidelink communication, a message authentication code that is based at least in part on the derived security key. In connection with receiving the sidelink communication from the first UE 120-1, the second UE 120-2 may derive the security key from the common sidelink information transmitted in the slot (or the common sidelink information transmitted in a previous slot) by one or more other UEs based at least in part on the first level shared information and the second level shared information. In some aspects, the second UE 120-2 may use the derived security key to decrypt or decode the private information in the SCI (e.g., SCI-1 and/or SCI-2) and/or the sidelink data included in the sidelink communication. Additionally, or alternatively, the second UE 120-2 may verify or authenticate that the sidelink communication was transmitted from the first UE 120-1 based on using a message authentication code that is based at least in part on the derived security key.

In some aspects, the second UE 120-2 may transmit, and the first UE 120-1 may receive, the secure sidelink communication. In this case, the second UE 120-2 may derive the security key, for the sidelink communication in a slot, from the common sidelink information transmitted in the slot by one or more other UEs based at least in part on the first level shared information and the second level shared information. The second UE 120-2 may then use the derived security key to provide security for the sidelink communication transmitted from the first UE 120-1 to the second UE 120-2. For example, the second UE 120-2 may encrypt or encode private information in the SCI (e.g., SCI-1 and/or SCI-2) and/or the sidelink data included in the sidelink communication. Additionally, or alternatively, the second UE 120-2 may include, in the sidelink communication, a message authentication code that is based at least in part on the derived security key. In connection with receiving the sidelink communication from the second UE 120-2, the first UE 120-1 may derive the security key from the common sidelink information transmitted in the slot by one or more other UEs based at least in part on the first level shared information and the second level shared information. In some aspects, the first UE 120-1 may use the derived security key to decrypt or decode the private information in the SCI (e.g., SCI-1 and/or SCI-2) and/or the sidelink data included in the sidelink communication. Additionally, or alternatively, the first UE 120-1 may verify or authenticate that the sidelink communication was transmitted from the second UE 120-2 based on using a message authentication code that is based at least in part on the derived security key.

In some aspects, the common sidelink information included in SCI may be secured using a first key $K_c$ that is configured for all sidelink UEs 120 in the cell. For example, the first key $K_c$ may be pre-configured for a UE 120 (e.g., during manufacture of the UE 120). Alternatively, the first key $K_c$ may be configured for a UE 120 by the network node 702 (e.g., via an RRC message) or provided to a UE 120 by a home network associated with the UE 120. In some aspects, the first UE 120-1 and the second UE 120-2 may use the first $K_c$ to access the common sidelink information used to derive the security key, and the security key derived from the common sidelink information may be a second key $K_p$ used to secure private information in the sidelink communication between the first UE 120-1 and the second UE 120-2. In this case, the first UE 120-1 and/or the second UE 120-2 may use the first key $K_c$ to secure common information in the SCI included in the sidelink communication between the first UE 120-1 and the second UE 120-2, and the first UE 120-1 and/or the second UE 120-2 may use the derived security key (e.g., the second security key $K_p$) to secure private information in the SCI included in the sidelink communication between the first UE 120-1 and the second UE 120-2. In some aspects, the derived security key (e.g., the second security key $K_p$) may be used to secure private information for UEs 120 involved in a unicast sidelink communication session, UEs 120 involved in a connected groupcast sidelink communication session, and/or for UEs 120 within a specific distance d of another Tx UE (e.g., in a connectionless groupcast sidelink communication session).

As indicated above, FIG. 7 is provided as an example. Other examples may differ from what is described with respect to FIG. 7.

Figure 8:
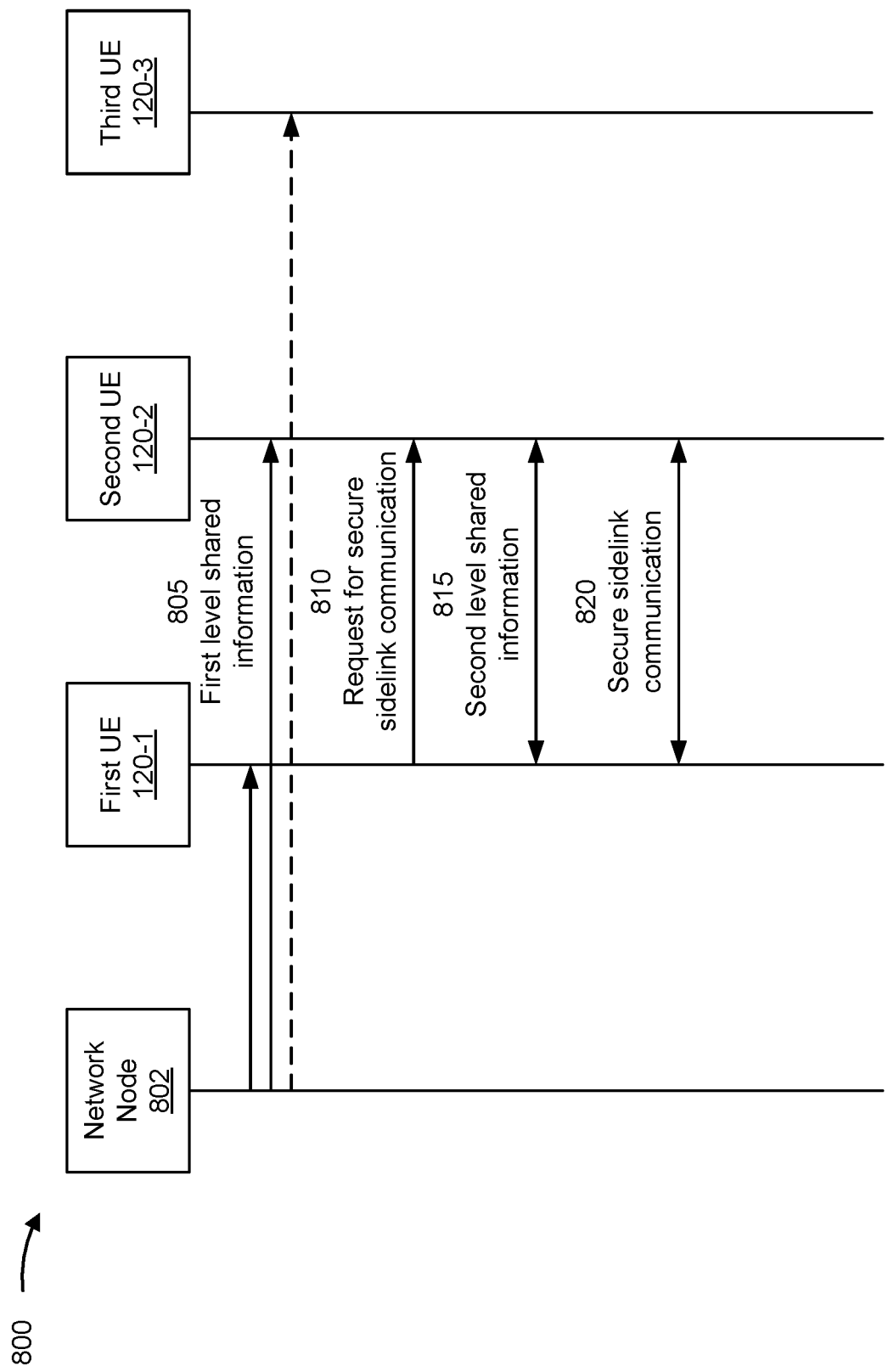

FIG. 8 is a diagram illustrating an example 800 associated with deriving physical layer keys for secure sidelink communication, in accordance with the present disclosure. As shown in FIG. 8, example 800 includes a network node 802, a first UE 120-1, a second UE 120-2, and a third UE 120-3. In some aspects, the network node 802 and the UEs 120 (e.g., the first UE 120-1, the second UE 120-2, and the third UE 120-3) may be included in a wireless network, such as wireless network 100. In some aspects, the network node 802 may correspond to one or more network nodes described elsewhere herein, such as network node 110. In some aspects, the network node 802 may be an RSU.

As shown in FIG. 8, and by reference number 805, the network node 802 may transmit, to at least the second UE 120-1 and the second UE 120-2, an indication of first level shared information. The first UE 120-1 and the second UE 120-2 may each receive the indication of the first level shared information. In some aspects, the network node 802 may also transmit the first level shared information to the third UE 120-3 and/or one or more other UEs in a cell associated with the network node 802. In this case, the third UE 120-3 and/or the one or more other UEs in the cell may receive the first level shared information.

The first level shared information may be information shared between at least the first UE 120-1 and the second UE 120-2 to be used (by the UEs), together with second level shared information, to derive a security key (e.g., a PHY layer security key) from common sidelink control information transmitted by one or more other UEs. The first level shared information may indicate a first level shared secret between at least the first UE 120-1 and the second UE 120-2. In some aspects, the first level shared information may indicate which fields, and how many bits in each field, of common sidelink information are to be used by the UEs 120 (e.g., the first UE 120-1 and the second UE 120-2) for deriving/constructing the security key from the common sidelink information transmitted (e.g., broadcast) by one or more other UEs. The common sidelink information may include common information in SCI (e.g., SCI-1 and/or SCI-2) and/or sidelink data transmitted by a UE. The first level shared information may indicate a set of fields in the common sidelink information and a set of bits in the set of fields to be used for deriving the security key. For example, the first level shared information may indicate N fields ($f_1$, $f_2$, ... $f_N$) of the sidelink control or data information, and a respective set of bits $\{c_i\}$ in each field $f_i$ to be used to derive the security key. In some aspects, a derived key $d_k$, derived from common sidelink information from a source UE k, may be defined by concatenation of $[\{c_1\}, \{c_2\}, \ldots \{c_N\}]$.

In some aspects, the first level shared information may indicate fields of the common sidelink information, and bits within the fields, to be used for deriving a security key on a per-slot basis. For example, the first level shared information may indicate the following fields (and bits) to be used, on a per-slot basis for deriving the security key: $c_1$=[bit1, bit3] of the HARQ process number from SCI-2; $c_2$=[bit1, bit10, bit 14] of the destination ID from SCI-2; $c_3$=[bit3, bit4] of the MCS from SCI-1; and $c_4$=[bit1 through bit10] of the sidelink data decoded from the PSSCH. In this case, a derived key $d_k$, derived from common sidelink information from a source UE k, may be denoted as $d_k$=[$c_1$, $c_2$, $c_3$, $c_4$].

In some aspects, the network node 802 may configure the first level shared information for the first UE 120-1, the second UE 120-2, and/or other UEs in the cell (e.g., the third UE 120-3) on a semi-static basis. For example, the network node 802 may transmit the indication of the first level shared information to the first UE 120-1, the second UE 120-2, the third UE 120-3, and/or one or more other UEs in an RRC message. Additionally, or alternatively, the network node 802 may transmit the first level shared information to the UEs 120 in a MAC-CE or DCI.

In some aspects, the first level shared information may be shared by all UEs in a cell associated with the network node 802. In this case, the network node 802 may transmit the first level shared information to all UEs in the cell. For example, the network node 802 may transmit the first level shared information to the first UE 120-1, the second UE 120-2, the third UE 120-3, and any other UEs in the cell. In this case, by transmitting the first level shared information to all UEs in the cell, the network node 802 may configure a common sidelink based key for all UEs in the cell.

In some aspects, the first level shared information may be shared only between UEs involved in establishing a secure link. For example, the first level shared information may be shared only between the first UE 120-1 and the second UE 120-2. In this case, the network node 802 may transmit the first level shared information only to the first UE 120-1 and the second UE 120-2. In some aspects, the network node 802 may transmit the first level shared information to the first UE 120-1 and the second UE 120-2 in connection with a secure link being established between the first UE 120-1 and the second UE 120-2. For example, the first UE 120-1 may transmit, to the network node 802, a request to establish a secure link for sidelink communication with the second UE 120-2, and the network node 802 may transmit the first level shared information to the first UE 120-1 and the second UE 120-2 based at least in part on receiving the request to establish a secure link between the first UE 120-1 and the second UE 120-2.

As further shown in FIG. 8, and by reference number 810, the first UE 120-1 may transmit, to the second UE 120-2, a request for a secure sidelink communication with the second UE 120-2. The second UE 120-2 may receive the request for the secure sidelink communication. For example, the first UE 120-1 may transmit the request via a PC5 RRC message or a PC5 MAC-CE. In some aspects, the request may be a request to establish a secure link for a sidelink communication session between the first UE 120-1 and the second UE 120-2. In some aspects, the request for the secure sidelink communication may be associated with sidelink ranging performed by the first UE 120-1 and/or the second UE 120-2.

As further shown in FIG. 8, and by reference number 815, the first UE 120-1 and the second UE 120-2 may communicate second level shared information to be used for deriving the security key. In some aspects, the second level shared information may be not explicitly indicated by the network node 802. In some aspects, the first UE 120-1 and the second UE 120-2 may use channel sensing to determine the second level shared information. In some aspects, such as in the case of sidelink ranging, the first level shared information may be configured by the network (e.g., transmitted to the UEs 120 by the network node 802) and the second level shared information may be derived by the UEs 120 involved in the sidelink ranging (e.g., the first UE 120-1 and the second UE 120-2).

In some aspects, the second level shared information may identify which one or more other UEs are to be used (by the first UE 120-1 and the second UE 120-2) as sources (e.g., source UEs) for the common sidelink information from which the security key is to be derived. For example, the second level shared information may identify one or more UEs (e.g., one or more source UEs) from which to receive the common sidelink information to be used for deriving the security key. In some aspects, the first UE 120-1 and the second UE 120-2 may use channel sensing to determine the one or more source UEs. The first UE 120-1 may use channel sensing to determine a first sensed set of UEs $\{p_i\}$, where $\{p_1, p_2, \ldots p_n\}$ represents the source IDs of other UEs whose SCI can be decoded by the first UE 120-1. The second UE 120-2 may use channel sensing to determine a second sensed set of UEs $\{q_i\}$, where $\{q_1, q_2, \ldots q_m\}$ represents the source IDs of other UEs whose SCI can be decoded by the second UE 120-2. In some aspects, the first UE 120-1 and the second UE 120-2 may exchange sidelink communications (e.g., via PC5 RRC messages and/or PC5 MAC-CEs) to the one or more source UEs (e.g., the second level shared information) based at least in part on the first sensed set of UEs $\{p_i\}$ and the second sensed set of UEs $\{q_i\}$. For example, the first UE 120-1 may transmit an indication of the first sensed set of UEs $\{p_i\}$ to the second UE 120-2, and/or the second UE 120-2 may transmit an indication of the second sensed set of UEs to the first UE 120-1. In some aspects, the first UE 120-1 may determine the one or more source UEs (and select the order of the one or more source UEs) based at least in part on the first sensed set of UEs $\{p_i\}$ and the second sensed set of UEs $\{q_i\}$, and the first UE 120-1 may transmit, to the second UE 120-2, an indication that identifies the one or more source UEs. In this case, the second UE 120-2 may transmit, to the first UE 120-1, an indication of whether the second UE 120-2 accepts the one or more source UEs determined by the first UE 120-1. In some aspects, the second UE 120-2 may determine the one or more source UEs (and select the order of the one or more source UEs) based at least in part on the first sensed set of UEs $\{p_i\}$ and the second sensed set of UEs $\{q_i\}$, and the second UE 120-2 may transit, to the first UE 120-1, an indication that identifies the one or more source UEs. In this case, the first UE 120-1 may transmit, to the second UE 120-2, an indication of whether the first UE 120-1 accepts the one or more source UEs determined by the second UE 120-2. In some aspects, the one or more source UEs determined by the first UE 120-1 and/or the second UE 120-2 may include one or more UEs selected from a set of common UEs between the first sensed set of UEs $\{p_i\}$ and the second sensed set of UEs $\{q_i\}$.

In some aspects, by communicating to determine the second level shared information (e.g., the one or more source UEs), the first UE 120-1 and the second UE 120-2 may derive the same security key based at least in part on the first level shared information and the second level shared information. In some aspects, the first UE 120-1 and the second UE 120-2 may each derive the security key, on a per-slot basis, from the set of bits in the set of fields (indicated by the first level shared information) in the common sidelink information received from the one or more UEs (indicated by the second level shared information). For example, in a case in which the second level shared information identifies a set of source UEs $\{k_1, k_2, k_3\}$, the first UE 120-1 and the second UE 120-2 may derive the security key, for a sidelink communication in a slot, as $K=[d_{k_1}, d_{k_2}, d_{k_3}]$ (e.g., by concatenating respective derived keys constructed (in accordance with the first level shared information) from the common sidelink information transmitted by the indicated source UEs in the slot). In some aspects, the second level shared information, determined by the first UE 120-1 and/or the second UE 120-2, may also indicate the order of the source UEs (e.g., the order for concatenating the bits extracted from the common sidelink information received from the source UEs).

In some aspects, the second level shared information may identify one or more subchannels on which to receive the common sidelink information to be used for deriving the security key. In some aspects, the first UE 120-1 may select the one or more subchannels on which to receive the common sidelink information to be used for deriving the security key (and the order of the one or more subchannels), and the first UE 120-1 may transmit, to the second UE 120-2 (e.g., via a PC5 RRC message or a PC5 MAC-CE), an indication of the selected one or more subchannels. In this case, the second UE 120-2 may transmit, to the first UE 120-1 (e.g., via a PC5 RRC message or a PC5 MAC-CE), an indication of whether the second UE 120-2 accepts the selected one or more subchannels. In some aspects, the second UE 120-2 may select the one or more subchannels on which to receive the common sidelink information to be used for deriving the security key (and the order of the one or more subchannels), and the second UE 120-2 may transmit, to the first UE 120-1, an indication of the selected one or more subchannels. In this case, the first UE 120-1 may transmit, to the second UE 120-2, an indication of whether the first UE 120-1 accepts the selected one or more subchannels. In a case in which the second level shared information identifies one or more subchannels, the first UE 120-1 and the second UE 120-2 may each derive the security key, on a per-slot basis, from the set of bits in the set of fields (indicated by the first level shared information) in the common sidelink information transmitted (e.g., by one or more other UEs) on the one or more subchannels identified by the second level shared information. For example, the first UE 120-1 and the second UE 120-2 may derive the security key by concatenating the set of bits in the set of fields in the common sidelink information received on the one or more subchannels identified by the second level shared information. In some aspects, the second level shared information may also indicate the order of the subchannels (e.g., the order for concatenating the bits extracted from the common sidelink information received on the indicated subchannels).

In some aspects, in a case in which the first level shared information is a shared secret only between the first UE 120-1 and the second UE 120-2, the first UE 120-1 and the second UE 120-2 may communicate the second level shared information (e.g., the indication of the one or more source UEs and/or the one or more subchannels) via unsecured sidelink communications. For example, in this case, the first UE 120-1 and/or the second UE 120-2 may transmit the second level shared information (e.g., the indication of the one or more source UEs and/or the one or more subchannels) using clear (e.g., unencrypted) text.

As further shown in FIG. 8, and by reference number 820, the first UE 120-1 and the second UE 120-2 may communicate, via a secure sidelink communication, using the security key derived based at least in part on the first level shared information and the second level shared information. The security key may be a sequence of bits extracted from the common sidelink information transmitted by one or more other UEs (e.g., the one or more source UEs) based at least in part on the first level shared information and the second level shared information. The first UE 120-1 and the second UE 120-2 may derive the security key independently, with respect to each other, based at least in part on the first level shared information and the second level shared information.

In some aspects, the first UE 120-1 may transmit, and the second UE 120-2 may receive, the secure sidelink communication. In this case, the first UE 120-1 may derive the security key, for the sidelink communication in a slot, from the common sidelink information transmitted in the slot by one or more other UEs based at least in part on the first level shared information and the second level shared information. The first UE 120-1 may then use the derived security key to provide security for the sidelink communication transmitted from the first UE 120-1 to the second UE 120-2. For example, the first UE 120-1 may encrypt or encode private information in the SCI (e.g., SCI-1 and/or SCI-2) and/or the sidelink data included in the sidelink communication. Additionally, or alternatively, the first UE 120-1 may include, in the sidelink communication, a message authentication code that is based at least in part on the derived security key. In connection with receiving the sidelink communication from the first UE 120-1, the second UE 120-2 may derive the security key from the common sidelink information transmitted in the slot by one or more other UEs based at least in part on the first level shared information and the second level shared information. In some aspects, the second UE 120-2 may use the derived security key to decrypt or decode the private information in the SCI (e.g., SCI-1 and/or SCI-2) and/or the sidelink data included in the sidelink communication. Additionally, or alternatively, the second UE 120-2 may verify or authenticate that the sidelink communication was transmitted from the first UE 120-1 based on using a message authentication code that is based at least in part on the derived security key.

In some aspects, the second UE 120-2 may transmit, and the first UE 120-1 may receive, the secure sidelink communication. In this case, the second UE 120-2 may derive the security key, for the sidelink communication in a slot, from the common sidelink information transmitted in the slot by one or more other UEs based at least in part on the first level shared information and the second level shared information. The second UE 120-2 may then use the derived security key to provide security for the sidelink communication transmitted from the first UE 120-1 to the second UE 120-2. For example, the second UE 120-2 may encrypt or encode private information in the SCI (e.g., SCI-1 and/or SCI-2) and/or the sidelink data included in the sidelink communication. Additionally, or alternatively, the second UE 120-2 may include, in the sidelink communication, a message authentication code that is based at least in part on the derived security key. In connection with receiving the sidelink communication from the second UE 120-2, the first UE 120-1 may derive the security key from the common sidelink information transmitted in the slot by one or more other UEs based at least in part on the first level shared information and the second level shared information. In some aspects, the first UE 120-1 may use the derived security key to decrypt or decode the private information in the SCI (e.g., SCI-1 and/or SCI-2) and/or the sidelink data included in the sidelink communication. Additionally, or alternatively, the first UE 120-1 may verify or authenticate that the sidelink communication was transmitted from the second UE 120-2 based on using a message authentication code that is based at least in part on the derived security key.

As indicated above, FIG. 8 is provided as an example. Other examples may differ from what is described with respect to FIG. 8.

Figure 9:
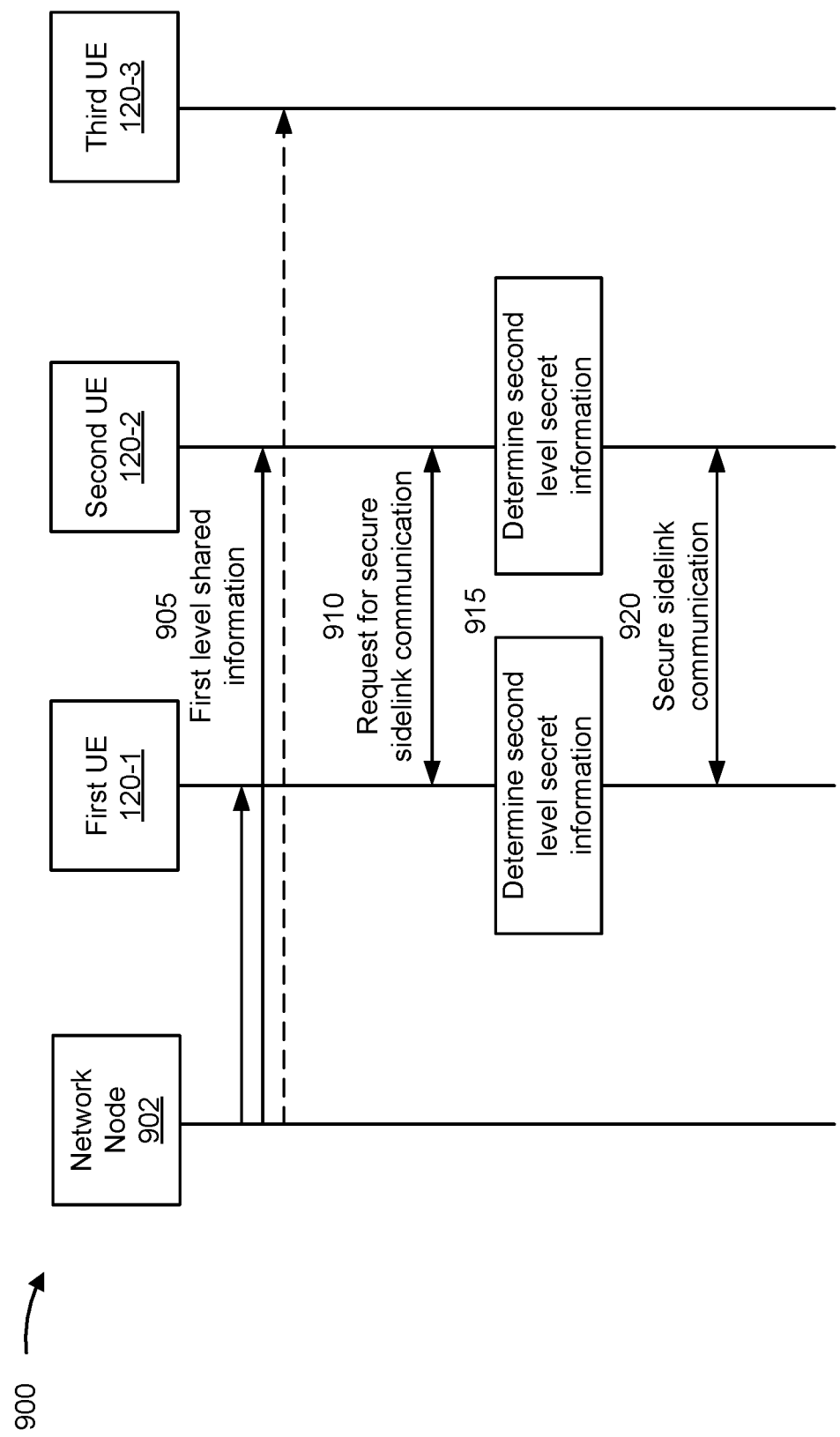

FIG. 9 is a diagram illustrating an example 900 associated with deriving physical layer keys for secure sidelink communication, in accordance with the present disclosure. As shown in FIG. 9, example 900 includes a network node 902, a first UE 120-1, a second UE 120-2, and a third UE 120-3. In some aspects, the network node 902 and the UEs 120 (e.g., the first UE 120-1, the second UE 120-2, and the third UE 120-3) may be included in a wireless network, such as wireless network 100. In some aspects, the network node 902 may correspond to one or more network nodes described elsewhere herein, such as network node 110. In some aspects, the network node 902 may be an RSU.

As shown in FIG. 9, and by reference number 905, the network node 902 may transmit, to at least the second UE 120-1 and the second UE 120-2, an indication of first level shared information. The first UE 120-1 and the second UE 120-2 may each receive the indication of the first level shared information. In some aspects, the network node 902 may also transmit the first level shared information to the third UE 120-3 and/or one or more other UEs in a cell associated with the network node 902. In this case, the third UE 120-3 and/or the one or more other UEs in the cell may receive the first level shared information.

The first level shared information may be information shared between at least the first UE 120-1 and the second UE 120-2 to be used (by the UEs), together with second level shared information, to derive a security key (e.g., a PHY layer security key) from common sidelink control information transmitted by one or more other UEs. The first level shared information may indicate a first level shared secret between at least the first UE 120-1 and the second UE 120-2. In some aspects, the first level shared information may indicate which fields, and how many bits in each field, of common sidelink information are to be used by the UEs 120 (e.g., the first UE 120-1 and the second UE 120-2) for deriving/constructing the security key from the common sidelink information transmitted (e.g., broadcast) by one or more other UEs. The common sidelink information may include common information in SCI (e.g., SCI-1 and/or SCI-2) and/or sidelink data transmitted by a UE. The first level shared information may indicate a set of fields in the common sidelink information and a set of bits in the set of fields to be used for deriving the security key. For example, the first level shared information may indicate N fields ($f_1$, $f_2$, ... $f_N$) of the sidelink control or data information, and a respective set of bits $\{c_i\}$ in each field $f_i$ to be used to derive the security key. In some aspects, a derived key $d_k$, derived from common sidelink information from a source UE k, may be defined by concatenation of $[\{c_1\}, \{c_2\}, \ldots \{c_N\}]$.

In some aspects, the first level shared information may indicate fields of the common sidelink information, and bits within the fields, to be used for deriving a security key on a per-slot basis. For example, the first level shared information may indicate the following fields (and bits) to be used, on a per-slot basis for deriving the security key: $c_1$=[bit1, bit3] of the HARQ process number from SCI-2; $c_2$=[bit1, bit10, bit 14] of the destination ID from SCI-2; $c_3$=[bit3, bit4] of the MCS from SCI-1; and $c_4$=[bit1 through bit10] of the sidelink data decoded from the PSSCH. In this case, a derived key $d_k$, derived from common sidelink information from a source UE k, may be denoted as $d_k$=[$c_1$, $c_2$, $c_3$, $c_4$].

In some aspects, the network node 902 may configure the first level shared information for the first UE 120-1, the second UE 120-2, and/or other UEs in the cell (e.g., the third UE 120-3) on a semi-static basis. For example, the network node 902 may transmit the indication of the first level shared information to the first UE 120-1, the second UE 120-2, the third UE 120-3, and/or one or more other UEs in an RRC message. Additionally, or alternatively, the network node 902 may transmit the first level shared information to the UEs 120 in a MAC-CE or DCI.

In some aspects, the first level shared information may be shared by all UEs in a cell associated with the network node 902. In this case, the network node 902 may transmit the first level shared information to all UEs in the cell. For example, the network node 902 may transmit the first level shared information to the first UE 120-1, the second UE 120-2, the third UE 120-3, and any other UEs in the cell. In this case, by transmitting the first level shared information to all UEs in the cell, the network node 902 may configure a common sidelink based key for all UEs in the cell.

In some aspects, the first level shared information may be shared only between UEs involved in establishing a secure link. For example, the first level shared information may be shared only between the first UE 120-1 and the second UE 120-2. In this case, the network node 902 may transmit the first level shared information only to the first UE 120-1 and the second UE 120-2. In some aspects, the network node 902 may transmit the first level shared information to the first UE 120-1 and the second UE 120-2 in connection with a secure link being established between the first UE 120-1 and the second UE 120-2. For example, the first UE 120-1 may transmit, to the network node 902, a request to establish a secure link for sidelink communication with the second UE 120-2, and the network node 902 may transmit the first level shared information to the first UE 120-1 and the second UE 120-2 based at least in part on receiving the request to establish a secure link between the first UE 120-1 and the second UE 120-2.

As further shown in FIG. 9, and by reference number 910, the first UE 120-1 may transmit, to the second UE 120-2, a request for a secure sidelink communication with the second UE 120-2. The second UE 120-2 may receive the request for the secure sidelink communication. For example, the first UE 120-1 may transmit the request via a PC5 RRC message or a PCG MAC-CE. In some aspects, the request may be a request to establish a secure link for a sidelink communication session between the first UE 120-1 and the second UE 120-2. In some aspects, the request for the secure sidelink communication may be associated with sidelink ranging performed by the first UE 120-1 and/or the second UE 120-2.

As further shown in FIG. 9, and by reference number 915, the first UE 120-1 and the second UE 120-2 may each determine second level shared information to be used for deriving the security key. In some aspects, the second level shared information may be not explicitly indicated by the network node 902. In some aspects, the first UE 120-1 and the second UE 120-2 may use channel sensing to determine the second level shared information. In some aspects, such as in the case of sidelink ranging, the first level shared information may be configured by the network (e.g., transmitted to the UEs 120 by the network node 902) and the second level shared information may be derived by the UEs 120 involved in the sidelink ranging (e.g., the first UE 120-1 and the second UE 120-2).

In some aspects, the first UE 120-1 and the second UE 120-2 may independently determine the second level shared information (e.g., without communicating the second level shared information between the first UE 120-1 and the second UE 120-2). In some aspects, in a case in which the first level shared information is shared with all of the UEs in the cell (e.g., the first level shared information is not a shared secret between only the first UE 120-1 and the second UE 120-2), the second level shared information may be a shared secret between only the first UE 120-1 and the second UE 120-2. In this case, the first UE 120-1 and the second UE 120-2 may independently determine the second level shared information without indicating the second level shared information in any communications between the first UE 120-1 and the second UE 120-2.

In some aspects, the second level shared information may identify which one or more other UEs are to be used (by the first UE 120-1 and the second UE 120-2) as sources (e.g., source UEs) for the common sidelink information from which the security key is to be derived. For example, the second level shared information may identify one or more UEs (e.g., one or more source UEs) from which to receive the common sidelink information to be used for deriving the security key. In some aspects, the first UE 120-1 and the second UE 120-2 may use channel sensing to determine the one or more source UEs. The first UE 120-1 may use channel sensing to determine a first sensed set of UEs $\{p_i\}$, where $\{p_1, p_2, \ldots p_n\}$ represents the source IDs of other UEs whose SCI can be decoded by the first UE 120-1. The second UE 120-2 may use channel sensing to determine a second sensed set of UEs $\{q_i\}$, where $\{q_1, q_2, \ldots q_m\}$ represents the source IDs of other UEs whose SCI can be decoded by the second UE 120-2. In some aspects, the first UE 120-1 and the second UE 120-2 may independently select a set of source UEs from $\{p_i\}$ and $\{q_i\}$, respectively. In some aspects, the first UE 120-1 and the second UE 120-2 may each be configured with a shared secret selection parameter to increase the likelihood that the first UE 120-1 and the second UE 120-2 select the same set of source UEs.

In some aspects, the first UE 120-1 and the second UE 120-2 may select a set of source UEs based at least in part on RSRP measurements for the UEs in the respective sensed sets of UEs $\{p_i\}$ and $\{q_i\}$. In some aspects, the first UE 120-1 and the second UE 120-2 may each select one or more source UEs with RSRP measurements within a configured range [a, b]. For example, the configured range [a, b] may imply that the first UE 120-1 and the second UE 120-2 are observing other UEs that are at roughly the same distance from the first UE 120-1 and the second UE 120-2. In some aspects, the configured range [a, b] may be a shared secret between the first UE 120-1 and the second UE 120-2. In some aspects, the configured range may be pre-configured for the first UE 120-1 and the second UE 120-2, configured for the first UE 120-1 and the second UE 120-2 by the network node 902, or agreed on by the first UE 120-1 and the second UE 120-2 in sidelink communications to establish a sidelink communication session between the first UE 120-1 and the second UE 120-2. In some aspects, in a case in which multiple UEs have RSRP measurements within the configured range [a, b], the first UE 120-1 and the second UE 120-2 may each select a quantity (l) of UEs with the highest source IDs (or the lowest source IDs) among the UEs with RSRP measurements within the configured range [a, b].

In some aspects, the first UE 120-1 and the second UE 120-2 may each select a set of source UEs based at least in part on reported locations for the UEs in the respective sensed sets of UEs $\{p_i\}$ and $\{q_i\}$. In some aspects, the first UE 120-1 and the second UE 120-2 may each select one or more source UEs that report the same zone(s)/location(s). For example, the first UE 120-1 and the second UE 120-2 may each select one or more source UEs that report a location within a configured zone, of a plurality of geographic zones. In some aspects, the configured zone (or multiple configured zones) may be a shared secret between the first UE 120-1 and the second UE 120-2. In some aspects, the configured zone(s) may be pre-configured for the first UE 120-1 and the second UE 120-2, configured for the first UE 120-1 and the second UE 120-2 by the network node 902, or agreed on by the first UE 120-1 and the second UE 120-2 in sidelink communications to establish a sidelink communication session between the first UE 120-1 and the second UE 120-2. In some aspects, in a case in which multiple UEs report locations within the configured zone(s), the first UE 120-1 and the second UE 120-2 may each select a quantity (l) of UEs with the highest source IDs (or the lowest source IDs) among the UEs reporting locations within the zone(s).

In some aspects, once the first UE 120-1 and the second UE 120-2 independently determine the second level shared information (e.g., the set of source UEs), the first UE 120-1 and the second UE 120-2 may each derive the security key, on a per-slot basis, from the set of bits in the set of fields (indicated by the first level shared information) in the common sidelink information received from the one or more source UEs (indicated by the second level shared information). For example, in a case in which the second level shared information identifies a set of source UEs $\{k_1, k_2, k_3\}$, the first UE 120-1 and the second UE 120-2 may derive the security key, for a sidelink communication in a slot, as $K=[d_{k_1}, d_{k_2}, d_{k_3}]$ (e.g., by concatenating respective derived keys constructed (in accordance with the first level shared information) from the common sidelink information transmitted by the source UEs in the slot).

In some aspects, the second level shared information may identify one or more subchannels on which to receive the common sidelink information to be used for deriving the security key. In some aspects, the first UE 120-1 and the second UE 120-2 may each independently select a set of subchannels based at least in part on RSRP measurements on the subchannels. In some aspects, the first UE 120-1 and the second UE 120-2 may each select one or more subchannels with RSRP measurements within a configured range [a, b]. In some aspects, the configured range [a, b] may be a shared secret between the first UE 120-1 and the second UE 120-2. In some aspects, the configured range may be pre-configured for the first UE 120-1 and the second UE 120-2, configured for the first UE 120-1 and the second UE 120-2 by the network node 902, or agreed on by the first UE 120-1 and the second UE 120-2 in sidelink communications to establish a sidelink communication session between the first UE 120-1 and the second UE 120-2.

In a case in which the second level shared information identifies one or more subchannels, the first UE 120-1 and the second UE 120-2 may each derive the security key, on a per-slot basis, from the set of bits in the set of fields (indicated by the first level shared information) in the common sidelink information transmitted (e.g., by one or more other UEs) on the one or more subchannels. For example, the first UE 120-1 and the second UE 120-2 may derive the security key by concatenating the set of bits in the set of fields in the common sidelink information received on the one or more subchannels identified by the second level shared information. In some aspects, the second level shared information may also indicate the order of the subchannels (e.g., the order for concatenating the bits extracted from the common sidelink information received on the indicated subchannels).

As further shown in FIG. 9, and by reference number 920, the first UE 120-1 and the second UE 120-2 may communicate, via a secure sidelink communication, using the security key derived based at least in part on the first level shared information and the second level shared information. The security key may be a sequence of bits extracted from the common sidelink information transmitted by one or more other UEs (e.g., the one or more source UEs) based at least in part on the first level shared information and the second level shared information. The first UE 120-1 and the second UE 120-2 may derive the security key independently, with respect to each other, based at least in part on the first level shared information and the second level shared information.

In some aspects, the first UE 120-1 may transmit, and the second UE 120-2 may receive, the secure sidelink communication. In this case, the first UE 120-1 may derive the security key, for the sidelink communication in a slot, from the common sidelink information transmitted in the slot by one or more other UEs based at least in part on the first level shared information and the second level shared information. The first UE 120-1 may then use the derived security key to provide security for the sidelink communication transmitted from the first UE 120-1 to the second UE 120-2. For example, the first UE 120-1 may encrypt or encode private information in the SCI (e.g., SCI-1 and/or SCI-2) and/or the sidelink data included in the sidelink communication. Additionally, or alternatively, the first UE 120-1 may include, in the sidelink communication, a message authentication code that is based at least in part on the derived security key. In connection with receiving the sidelink communication from the first UE 120-1, the second UE 120-2 may derive the security key from the common sidelink information transmitted in the slot by one or more other UEs based at least in part on the first level shared information and the second level shared information. In some aspects, the second UE 120-2 may use the derived security key to decrypt or decode the private information in the SCI (e.g., SCI-1 and/or SCI-2) and/or the sidelink data included in the sidelink communication. Additionally, or alternatively, the second UE 120-2 may verify or authenticate that the sidelink communication was transmitted from the first UE 120-1 based on using a message authentication code that is based at least in part on the derived security key.

In some aspects, the second UE 120-2 may transmit, and the first UE 120-1 may receive, the secure sidelink communication. In this case, the second UE 120-2 may derive the security key, for the sidelink communication in a slot, from the common sidelink information transmitted in the slot by one or more other UEs based at least in part on the first level shared information and the second level shared information. The second UE 120-2 may then use the derived security key to provide security for the sidelink communication transmitted from the first UE 120-1 to the second UE 120-2. For example, the second UE 120-2 may encrypt or encode private information in the SCI (e.g., SCI-1 and/or SCI-2) and/or the sidelink data included in the sidelink communication. Additionally, or alternatively, the second UE 120-2 may include, in the sidelink communication, a message authentication code that is based at least in part on the derived security key. In connection with receiving the sidelink communication from the second UE 120-2, the first UE 120-1 may derive the security key from the common sidelink information transmitted in the slot by one or more other UEs based at least in part on the first level shared information and the second level shared information. In some aspects, the first UE 120-1 may use the derived security key to decrypt or decode the private information in the SCI (e.g., SCI-1 and/or SCI-2) and/or the sidelink data included in the sidelink communication. Additionally, or alternatively, the first UE 120-1 may verify or authenticate that the sidelink communication was transmitted from the second UE 120-2 based on using a message authentication code that is based at least in part on the derived security key.

As indicated above, FIG. 9 is provided as an example. Other examples may differ from what is described with respect to FIG. 9.

Figure 10:
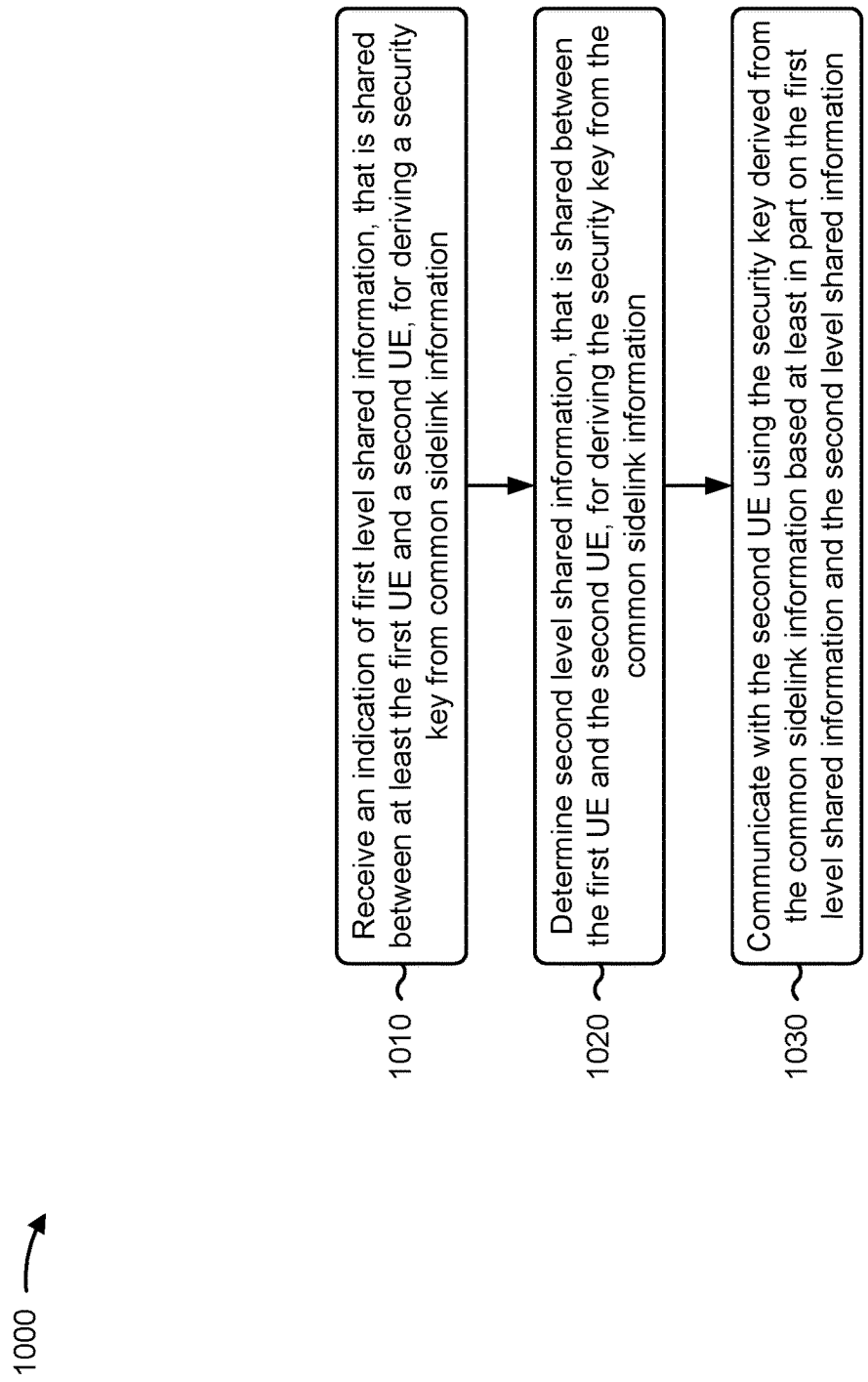
FIGS. 10-11 are diagrams illustrating an example processes associated with deriving physical layer keys for secure sidelink communications, in accordance with the present disclosure.

FIG. 10 is a diagram illustrating an example process 1000 performed, for example, by a first UE, in accordance with the present disclosure. Example process 1000 is an example where the first UE (e.g., UE 120) performs operations associated with deriving physical layer keys for secure sidelink communication.

As shown in FIG. 10, in some aspects, process 1000 may include receiving, from a network node, an indication of first level shared information, that is shared between at least the first UE and a second UE, for deriving a security key from common sidelink information (block 1010). For example, the first UE (e.g., using communication manager 140 and/or reception component 1202, depicted in FIG. 12) may receive, from a network node, an indication of first level shared information, that is shared between at least the first UE and a second UE, for deriving a security key from common sidelink information, as described above.

As further shown in FIG. 10, in some aspects, process 1000 may include determining second level shared information, that is shared between the first UE and the second UE, for deriving the security key from the common sidelink information (block 1020). For example, the first UE (e.g., using communication manager 140 and/or determination component 1208, depicted in FIG. 12) may determine second level shared information, that is shared between the first UE and the second UE, for deriving the security key from the common sidelink information, as described above.

As further shown in FIG. 10, in some aspects, process 1000 may include communicating with the second UE using the security key derived from the common sidelink information based at least in part on the first level shared information and the second level shared information (block 1030). For example, the UE (e.g., using communication manager 140, reception component 1202, and/or transmission component 1204, depicted in FIG. 12) may communicate with the second UE using the security key derived from the common sidelink information based at least in part on the first level shared information and the second level shared information, as described above.

Process 1000 may include additional aspects, such as any single aspect or any combination of aspects described below and/or in connection with one or more other processes described elsewhere herein.

In a first aspect, the first level shared information indicates a set of fields in the common sidelink information and a set of bits in the set of fields to be used for deriving the security key, and the second level shared information identifies one or more UEs from which to receive the common sidelink information to be used for deriving the security key.

In a second aspect, process 1000 includes deriving the security key for communicating with the second UE in a slot based at least in part on the set of bits in the set of fields in the common sidelink information received, in the slot, from each of the one or more UEs in the slot.

In a third aspect, deriving the security key includes concatenating the set of bits in the set of fields in the common sidelink information received from each of the one or more UEs.

In a fourth aspect, the first level shared information is shared between the first UE, the second UE, and one or more other UEs in a cell associated with the network node.

In a fifth aspect, the first level shared information is shared only between the first UE and the second UE.

In a sixth aspect, process 1000 includes transmitting, to the network node, a request for establishing a secure link for sidelink communication with the second UE, and receiving the indication of the first level shared information is based at least in part on transmitting the request for establishing the secure link for sidelink communication with the second UE.

In a seventh aspect, determining the second level shared information includes receiving, from the network node, an indication of the second level shared information.

In an eighth aspect, process 1000 includes transmitting, to the network node, a request for establishing a secure link for sidelink communication with the second UE, where receiving the indication of the second level shared information is based at least in part on transmitting the request for establishing the secure link for sidelink communication with the second UE.

In a ninth aspect, determining the second level shared information includes determining the second level shared information that identifies the one or more UEs based at least in part on a set of UEs sensed by the first UE using channel sensing.

In a tenth aspect, determining the second level shared information includes communicating, with the second UE, the second level shared information that identifies the one or more UEs, and the second level shared information that identifies the one or more UEs is based at least in part on a first sensed set of UEs associated with the first UE and a second sensed set of UEs associated with the second UE.

In an eleventh aspect, the one or more UEs include a set of common UEs among the first sensed set of UEs and the second sensed set of UEs.

In a twelfth aspect, determining the second level shared information includes selecting one or more UEs with RSRP measurements within a configured range as the one or more UEs from which to receive the common sidelink information to be used for deriving the security key.

In a thirteenth aspect, selecting the one or more UEs with the RSRP measurements within the configured range includes selecting a quantity of UEs with a highest or lowest source identifier from a set of UEs with RSRP measurements within the configured range.

In a fourteenth aspect, determining the second level shared information includes selecting the one or more UEs, from which to receive the common sidelink information to be used for deriving the security key, based at least in part on reported locations of the one or more UEs.

In a fifteenth aspect, selecting the one or more UEs includes selecting the one or more UEs based at least in part on the reported locations of the one or more UEs being within a configured zone.

In a sixteenth aspect, selecting the one or more UEs based at least in part on the reported locations of the one or more UEs being within the configured zone includes selecting a quantity of UEs with a highest or lowest source identifier from a set of UEs with reported locations within the configured zone.

In a seventeenth aspect, the first level shared information indicates a set of fields in the common sidelink information and a set of bits in the set of fields to be used for deriving the security key, and the second level shared information identifies one or more subchannels on which to receive the common sidelink information to be used for deriving the security key.

In an eighteenth aspect, determining the second level shared information includes receiving, from the network node, an indication of the one or more subchannels on which to receive the common sidelink information to be used for deriving the security key.

In a nineteenth aspect, determining the second level shared information includes communicating, with the second UE, the second level shared information that identifies the one or more subchannels on which to receive the common sidelink information to be used for deriving the security key.

In a twentieth aspect, determining the second level shared information includes selecting the one or more subchannels based at least in part on RSRP measurements on the one or more sub channels.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
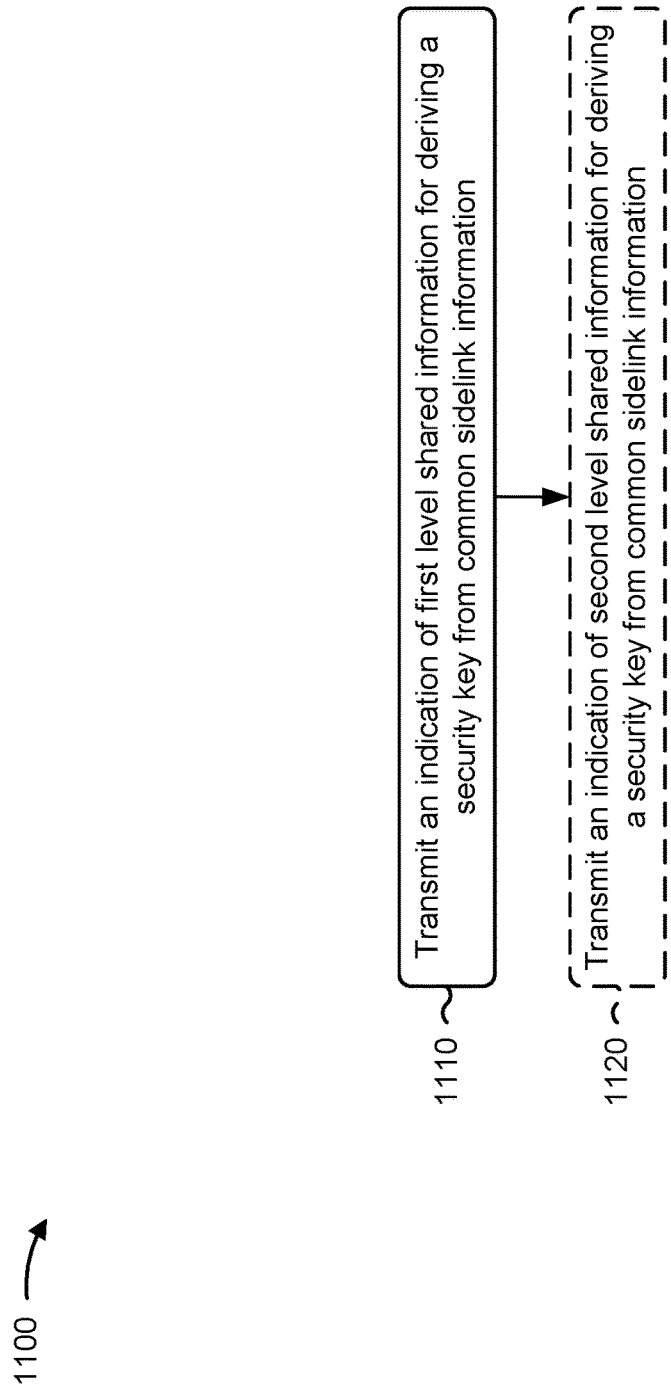

FIG. 11 is a diagram illustrating an example process 1100 performed, for example, by a network node, in accordance with the present disclosure. Example process 1100 is an example where the network node (e.g., network node 702, network node 802, and/or network node 902) performs operations associated with deriving physical layer keys for secure sidelink communication.

As shown in FIG. 11, in some aspects, process 1100 may include transmitting, to at least a first UE and a second UE, an indication of first level shared information for deriving a security key from common sidelink information (block 1110). For example, the network node (e.g., using communication manager 150 and/or transmission component 1304, depicted in FIG. 13) may transmit, to at least a first UE and a second UE, an indication of first level shared information for deriving a security key from common sidelink information, as described above.

As shown in FIG. 11, in some aspects, process 1100 may include transmitting, to the first UE and the second UE, an indication of second level shared information for deriving the security key from the common sidelink information (block 1120). For example, the network node (e.g., using communication manager 150 and/or transmission component 1304, depicted in FIG. 13) may transmit, to the first UE and the second UE, an indication of second level shared information for deriving the security key from the common sidelink information. In other aspects, the network node may not transmit the indication of the second level shared information to the first UE and the second UE.

Process 1100 may include additional aspects, such as any single aspect or any combination of aspects described below and/or in connection with one or more other processes described elsewhere herein.

In a first aspect, the first level shared information indicates a set of fields in the common sidelink information and a set of bits in the set of fields to be used for deriving the security key.

In a second aspect, transmitting the indication of the first level shared information includes transmitting the indication of the first level shared information to the first UE, the second UE, and one or more other UEs in a cell associated with the network node.

In a third aspect, transmitting the indication of the first level shared information includes transmitting the first level shared information only to the first UE and the second UE.

In a fourth aspect, process 1100 includes receiving, from the first UE, a request for establishing a secure link for sidelink communication between the first UE and the second UE, and transmitting the indication of the first level shared information is based at least in part on receiving the request for establishing the secure link for sidelink communication between the first UE and the second UE.

In a fifth aspect, the first level shared information indicates a set of fields in the common sidelink information and a set of bits in the set of fields to be used for deriving the security key, and the second level shared information identifies one or more UEs from which to receive the common sidelink information to be used for deriving the security key.

In a sixth aspect, process 1100 includes receiving, from the first UE, a request for establishing a secure link for sidelink communication between the first UE and the second UE, and transmitting the indication of the second level shared information is based at least in part on receiving the request for establishing the secure link for sidelink communication between the first UE and the second UE.

In a seventh aspect, the first level shared information indicates a set of fields in the common sidelink information and a set of bits in the set of fields to be used for deriving the security key, and the second level shared information identifies one or more subchannels on which to receive the common sidelink information to be used for deriving the security key.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
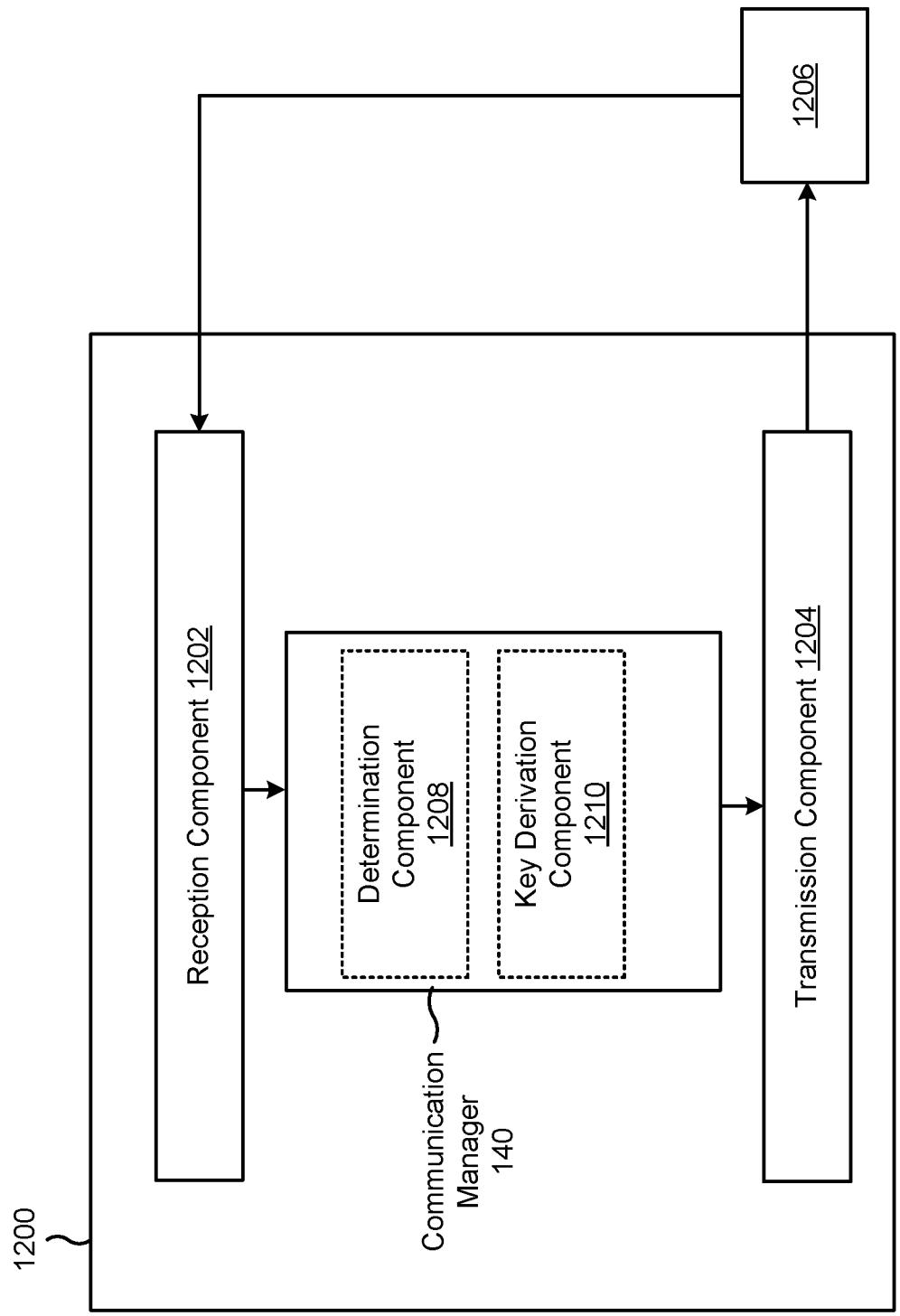
FIGS. 12-13 are diagrams of an example apparatuses for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a determination component 1208 and/or a key derivation component 1210, among other examples.

In some aspects, the apparatus 1200 may be configured to perform one or more operations described herein in connection with FIGS. 7-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, from a network node, an indication of first level shared information, that is shared between at least the UE and a second UE, for deriving a security key from common sidelink information. The determination component 1208 may determine second level shared information, that is shared between the UE and the second UE, for deriving the security key from the common sidelink information. The reception component 1202 and/or the transmission component 1204 may communicate with the second UE using the security key derived from the common sidelink information based at least in part on the first level shared information and the second level shared information.

The key derivation component 1210 may derive the security key for communicating with the second UE in a slot based at least in part on the set of bits in the set of fields in the common sidelink information received, in the slot, from each of the one or more UEs in the slot.

The transmission component 1204 may transmit, to the network node, a request for establishing a secure link for sidelink communication with the second UE, wherein receiving the indication of the first level shared information is based at least in part on transmitting the request for establishing the secure link for sidelink communication with the second UE.

The transmission component 1204 may transmit, to the network node, a request for establishing a secure link for sidelink communication with the second UE, wherein receiving the indication of the second level shared information is based at least in part on transmitting the request for establishing the secure link for sidelink communication with the second UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
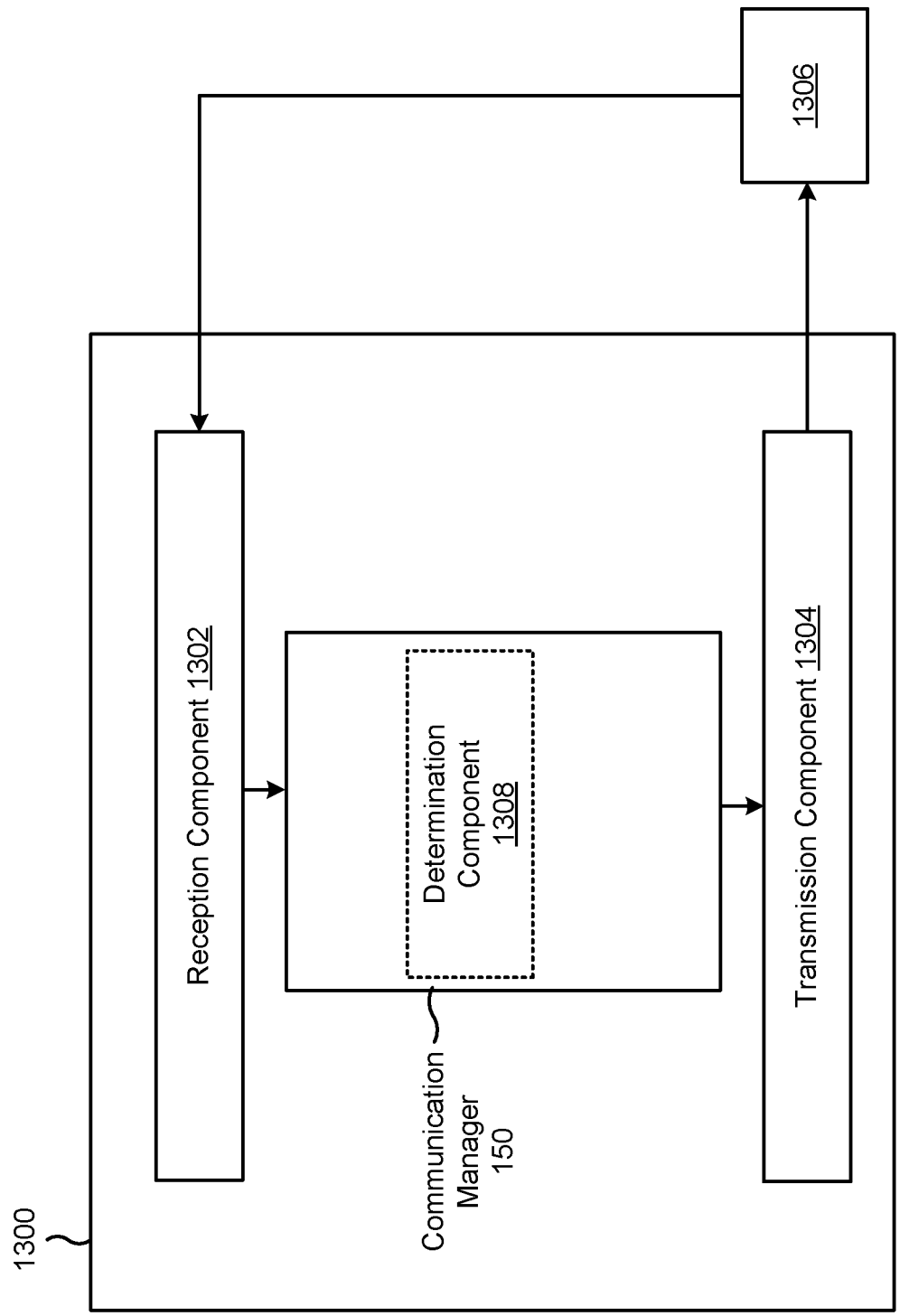

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a determination component 1308, among other examples.

In some aspects, the apparatus 1300 may be configured to perform one or more operations described herein in connection with FIGS. 6-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The transmission component 1304 may transmit, to at least a first UE and a second UE, an indication of first level shared information for deriving a security key from common sidelink information. The determination component 1308 may determine the first level shared information.

The reception component 1302 may receive, from the first UE, a request for establishing a secure link for sidelink communication between the first UE and the second UE, and the transmission of the indication of the first level shared information may be based at least in part on receiving the request for establishing the secure link for sidelink communication between the first UE and the second UE.

The transmission component 1304 may transmit, to the first UE and the second UE, an indication of second level shared information for deriving the security key from the common sidelink information.

The reception component 1302 may receive, from the first UE, a request for establishing a secure link for sidelink communication between the first UE and the second UE, and the transmission of the indication of second level shared information may be based at least in part on receiving the request for establishing the secure link for sidelink communication between the first UE and the second UE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first user equipment (UE), comprising: receiving, from a network node, an indication of first level shared information, that is shared between at least the first UE and a second UE, for deriving a security key from common sidelink information; determining second level shared information, that is shared between the first UE and the second UE, for deriving the security key from the common sidelink information; and communicating with the second UE using the security key derived from the common sidelink information based at least in part on the first level shared information and the second level shared information.

Aspect 2: The method of Aspect 1, wherein the first level shared information indicates a set of fields in the common sidelink information and a set of bits in the set of fields to be used for deriving the security key, and wherein the second level shared information identifies one or more UEs from which to receive the common sidelink information to be used for deriving the security key.

Aspect 3: The method of Aspect 2, further comprising: deriving the security key for communicating with the second UE in a slot based at least in part on the set of bits in the set of fields in the common sidelink information received, in the slot, from each of the one or more UEs in the slot.

Aspect 4: The method of Aspect 3, wherein deriving the security key comprises: concatenating the set of bits in the set of fields in the common sidelink information received from each of the one or more UEs.

Aspect 5: The method of any of Aspects 2-3, wherein the first level shared information is shared between the first UE, the second UE, and one or more other UEs in a cell associated with the network node.

Aspect 6: The method of any of Aspects 2-3, wherein the first level shared information is shared only between the first UE and the second UE.

Aspect 7: The method of Aspect 6, further comprising: transmitting, to the network node, a request for establishing a secure link for sidelink communication with the second UE, wherein receiving the indication of the first level shared information is based at least in part on transmitting the request for establishing the secure link for sidelink communication with the second UE.

Aspect 8: The method of any of Aspects 2-7, wherein determining the second level shared information comprises: receiving, from the network node, an indication of the second level shared information.

Aspect 9: The method of Aspect 8, further comprising: transmitting, to the network node, a request for establishing a secure link for sidelink communication with the second UE, wherein receiving the indication of the second level shared information is based at least in part on transmitting the request for establishing the secure link for sidelink communication with the second UE.

Aspect 10: The method of any of Aspects 2-7, wherein determining the second level shared information comprises: determining the second level shared information that identifies the one or more UEs based at least in part on a set of UEs sensed by the first UE using channel sensing.

Aspect 11: The method of any of Aspects 2-7 and 10, wherein determining the second level shared information comprises: communicating, with the second UE, the second level shared information that identifies the one or more UEs, wherein the second level shared information that identifies the one or more UEs is based at least in part on a first sensed set of UEs associated with the first UE and a second sensed set of UEs associated with the second UE.

Aspect 12: The method of Aspect 11, wherein the one or more UEs include a set of common UEs among the first sensed set of UEs and the second sensed set of UEs.

Aspect 13: The method of any of Aspects 2-7 and 10, wherein determining the second level shared information comprises: selecting one or more UEs with reference signal received power (RSRP) measurements within a configured range as the one or more UEs from which to receive the common sidelink information to be used for deriving the security key.

Aspect 14: The method of Aspect 13, wherein selecting the one or more UEs with the RSRP measurements within the configured range comprises: selecting a quantity of UEs with a highest or lowest source identifier from a set of UEs with RSRP measurements within the configured range.

Aspect 15: The method of any of Aspects 2-7 and 10, wherein determining the second level shared information comprises: selecting the one or more UEs, from which to receive the common sidelink information to be used for deriving the security key, based at least in part on reported locations of the one or more UEs.

Aspect 16: The method of Aspect 15, wherein selecting the one or more UEs comprises: selecting the one or more UEs based at least in part on the reported locations of the one or more UEs being within a configured zone.

Aspect 17: The method of Aspect 16, wherein selecting the one or more UEs based at least in part on the reported locations of the one or more UEs being within the configured zone comprises: selecting a quantity of UEs with a highest or lowest source identifier from a set of UEs with reported locations within the configured zone.

Aspect 18: The method of Aspect 1, wherein the first level shared information indicates a set of fields in the common sidelink information and a set of bits in the set of fields to be used for deriving the security key, and wherein the second level shared information identifies one or more subchannels on which to receive the common sidelink information to be used for deriving the security key.

Aspect 19: The method of Aspect 18, wherein determining the second level shared information comprises: receiving, from the network node, an indication of the one or more subchannels on which to receive the common sidelink information to be used for deriving the security key.

Aspect 20: The method of Aspect 18, wherein determining the second level shared information comprises: communicating, with the second UE, the second level shared information that identifies the one or more subchannels on which to receive the common sidelink information to be used for deriving the security key.

Aspect 21: The method of Aspect 18, wherein determining the second level shared information comprises: selecting the one or more subchannels based at least in part on reference signal received power (RSRP) measurements on the one or more subchannels.

Aspect 22: A method of wireless communication performed by a network node, comprising: transmitting, to at least a first user equipment (UE) and a second UE, an indication of first level shared information for deriving a security key from common sidelink information.

Aspect 23: The method of Aspect 22, wherein the first level shared information indicates a set of fields in the common sidelink information and a set of bits in the set of fields to be used for deriving the security key Aspect 24: The method of any of Aspects 22-23, wherein transmitting the indication of the first level shared information comprises: transmitting the indication of the first level shared information to the first UE, the second UE, and one or more other UEs in a cell associated with the network node.

Aspect 25: The method of any of Aspects 22-23, wherein transmitting the indication of the first level shared information comprises: transmitting the indication of the first level shared information only to the first UE and the second UE.

Aspect 26: The method of Aspect 25, further comprising: receiving, from the first UE, a request for establishing a secure link for sidelink communication between the first UE and the second UE, wherein transmitting the indication of the first level shared information is based at least in part on receiving the request for establishing the secure link for sidelink communication between the first UE and the second UE.

Aspect 27: The method of any of Aspects 22-26, further comprising: transmitting, to the first UE and the second UE, an indication of second level shared information for deriving the security key from the common sidelink information.

Aspect 28: The method of Aspect 27, wherein the first level shared information indicates a set of fields in the common sidelink information and a set of bits in the set of fields to be used for deriving the security key, and wherein the second level shared information identifies one or more UEs from which to receive the common sidelink information to be used for deriving the security key.

Aspect 29: The method of any of Aspects 27-28, further comprising: receiving, from the first UE, a request for establishing a secure link for sidelink communication between the first UE and the second UE, wherein transmitting the indication of second level shared information is based at least in part on receiving the request for establishing the secure link for sidelink communication between the first UE and the second UE.

Aspect 30: The method of any of Aspects 27 and 29, wherein the first level shared information indicates a set of fields in the common sidelink information and a set of bits in the set of fields to be used for deriving the security key, and wherein the second level shared information identifies one or more subchannels on which to receive the common sidelink information to be used for deriving the security key.

Aspect 31: An apparatus for wireless communication at a device, comprising a processor; memory coupled with the processor; and instructions stored in the memory and executable by the processor to cause the apparatus to perform the method of one or more of Aspects 1-21.

Aspect 32: A device for wireless communication, comprising a memory and one or more processors coupled to the memory, the one or more processors configured to perform the method of one or more of Aspects 1-21.

Aspect 33: An apparatus for wireless communication, comprising at least one means for performing the method of one or more of Aspects 1-21.

Aspect 34: A non-transitory computer-readable medium storing code for wireless communication, the code comprising instructions executable by a processor to perform the method of one or more of Aspects 1-21.

Aspect 35: A non-transitory computer-readable medium storing a set of instructions for wireless communication, the set of instructions comprising one or more instructions that, when executed by one or more processors of a device, cause the device to perform the method of one or more of Aspects 1-21.

Aspect 36: An apparatus for wireless communication at a device, comprising a processor; memory coupled with the processor; and instructions stored in the memory and executable by the processor to cause the apparatus to perform the method of one or more of Aspects 1-30.

Aspect 37: A device for wireless communication, comprising a memory and one or more processors coupled to the memory, the one or more processors configured to perform the method of one or more of Aspects 22-30.

Aspect 38: An apparatus for wireless communication, comprising at least one means for performing the method of one or more of Aspects 22-30.

Aspect 39: A non-transitory computer-readable medium storing code for wireless communication, the code comprising instructions executable by a processor to perform the method of one or more of Aspects 22-30.

Aspect 40: A non-transitory computer-readable medium storing a set of instructions for wireless communication, the set of instructions comprising one or more instructions that, when executed by one or more processors of a device, cause the device to perform the method of one or more of Aspects 22-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors, coupled to the one or more memories, configured to:
      receive, from a network node, an indication of first level shared information, that is shared between at least the first UE and a second UE, for deriving a physical layer security key from common sidelink information;
      determine second level shared information, that is shared between the first UE and the second UE, for deriving the physical layer security key from the common sidelink information; and
      communicate with the second UE using the physical layer security key derived from the common sidelink information based at least in part on the first level shared information and the second level shared information.

2. The first UE of claim 1, wherein the first level shared information indicates a set of fields in the common sidelink information and a set of bits in the set of fields to be used for deriving the physical layer security key, and wherein the second level shared information identifies one or more UEs from which to receive the common sidelink information to be used for deriving the physical layer security key.

3. The first UE of claim 2, wherein the one or more processors are further configured to:
   derive the physical layer security key for communicating with the second UE in a slot based at least in part on the set of bits in the set of fields in the common sidelink information received, in the slot, from each of the one or more UEs in the slot.

4. The first UE of claim 3, wherein the one or more processors, to derive the physical layer security key, are configured to:
   concatenate the set of bits in the set of fields in the common sidelink information received from each of the one or more UEs.

5. The first UE of claim 2, wherein the first level shared information is shared between the first UE, the second UE, and one or more other UEs in a cell associated with the network node.

6. The first UE of claim 2, wherein the first level shared information is shared only between the first UE and the second UE.

7. The first UE of claim 6, wherein the one or more processors are further configured to:
   transmit, to the network node, a request for establishing a secure link for sidelink communication with the second UE, wherein the one or more processors are configured to receive the indication of the first level shared information is based at least in part on transmitting the request for establishing the secure link for sidelink communication with the second UE.

8. The first UE of claim 2, wherein the one or more processors, to determine the second level shared information, are configured to:
   receive, from the network node, an indication of the second level shared information.

9. The first UE of claim 8, wherein the one or more processors are further configured to:
   transmit, to the network node, a request for establishing a secure link for sidelink communication with the second UE, wherein the one or more processors are configured to receive the indication of the second level shared information is based at least in part on transmitting the request for establishing the secure link for sidelink communication with the second UE.

10. The first UE of claim 2, wherein the one or more processors, to determine the second level shared information, are configured to:
    determine the second level shared information that identifies the one or more UEs based at least in part on a set of UEs sensed, using channel sensing, by the first UE.

11. The first UE of claim 2, wherein the one or more processors, to determine the second level shared information, are configured to:
    communicate, with the second UE, the second level shared information that identifies the one or more UEs, wherein the second level shared information that identifies the one or more UEs is based at least in part on a first sensed set of UEs associated with the first UE and a second sensed set of UEs associated with the second UE.

12. The first UE of claim 11, wherein the one or more UEs include a set of common UEs among the first sensed set of UEs and the second sensed set of UEs.

13. The first UE of claim 2, wherein the one or more processors, to determine the second level shared information, are configured to:

select one or more UEs with reference signal received power (RSRP) measurements within a configured range as the one or more UEs from which to receive the common sidelink information to be used for deriving the physical layer security key.

14. The first UE of claim 13, wherein the one or more processors, to select the one or more UEs with the RSRP measurements within the configured range, are configured to:
select a quantity of UEs with a highest or lowest source identifier from a set of UEs with RSRP measurements within the configured range.

15. The first UE of claim 2, wherein the one or more processors, to determine the second level shared information, are configured to:
select the one or more UEs, from which to receive the common sidelink information to be used for deriving the physical layer security key, based at least in part on reported locations of the one or more UEs.

16. The first UE of claim 15, wherein the one or more processors, to select the one or more UEs, are configured to:
select the one or more UEs based at least in part on the reported locations of the one or more UEs being within a configured zone.

17. The first UE of claim 16, wherein the one or more processors, to select the one or more UEs based at least in part on the reported locations of the one or more UEs being within the configured zone, are configured to:
select a quantity of UEs with a highest or lowest source identifier from a set of UEs with reported locations within the configured zone.

18. The first UE of claim 1, wherein the first level shared information indicates a set of fields in the common sidelink information and a set of bits in the set of fields to be used for deriving the physical layer security key, and wherein the second level shared information identifies one or more subchannels on which to receive the common sidelink information to be used for deriving the physical layer security key.

19. The first UE of claim 18, wherein the one or more processors, to determine the second level shared information, are configured to:
receive, from the network node, an indication of the one or more subchannels on which to receive the common sidelink information to be used for deriving the physical layer security key.

20. The first UE of claim 18, wherein the one or more processors, to determine the second level shared information, are configured to:
communicate, with the second UE, the second level shared information that identifies the one or more subchannels on which to receive the common sidelink information to be used for deriving the physical layer security key.

21. The first UE of claim 18, wherein the one or more processors, to determine the second level shared information, are configured to:
select the one or more subchannels based at least in part on reference signal received power (RSRP) measurements on the one or more subchannels.

22. A method of wireless communication performed by a first user equipment (UE), comprising:
receiving, from a network node, an indication of first level shared information, that is shared between at least the first UE and a second UE, for deriving a physical layer security key from common sidelink information;

determining second level shared information, that is shared between the first UE and the second UE, for deriving the physical layer security key from the common sidelink information; and
communicating with the second UE using the physical layer security key derived from the common sidelink information based at least in part on the first level shared information and the second level shared information.

23. The method of claim 22, wherein the first level shared information indicates a set of fields in the common sidelink information and a set of bits in the set of fields to be used for deriving the physical layer security key, and wherein the second level shared information identifies one or more UEs from which to receive the common sidelink information to be used for deriving the physical layer security key.

24. The method of claim 23, further comprising:
deriving the physical layer security key for communicating with the second UE in a slot based at least in part on the set of bits in the set of fields in the common sidelink information received, in the slot, from each of the one or more UEs in the slot.

25. The method of claim 23, wherein determining the second level shared information comprises:
receiving, from the network node, an indication of the second level shared information.

26. The method of claim 23, wherein determining the second level shared information comprises:
communicating, with the second UE, the second level shared information that identifies the one or more UEs, wherein the second level shared information that identifies the one or more UEs is based at least in part on a first sensed set of UEs associated with the first UE and a second sensed set of UEs associated with the second UE.

27. The method of claim 23, wherein determining the second level shared information comprises:
selecting one or more UEs with reference signal received power (RSRP) measurements within a configured range as the one or more UEs from which to receive the common sidelink information to be used for deriving the physical layer security key.

28. The method of claim 23, wherein determining the second level shared information comprises:
selecting the one or more UEs, from which to receive the common sidelink information to be used for deriving the physical layer security key, based at least in part on reported locations of the one or more UEs.

29. A non-transitory computer-readable medium storing a set of instructions for wireless communication, the set of instructions comprising:
one or more instructions that, when executed by one or more processors of a first user equipment (UE), cause the first UE to:
receive, from a network node, an indication of first level shared information, that is shared between at least the first UE and a second UE, for deriving a physical layer security key from common sidelink information;
determine second level shared information, that is shared between the first UE and the second UE, for deriving the physical layer security key from the common sidelink information; and
communicate with the second UE using the physical layer security key derived from the common sidelink information based at least in part on the first level shared information and the second level shared information.

30. An apparatus for wireless communication, comprising:
- means for receiving, from a network node, an indication of first level shared information, that is shared between at least the apparatus and a user equipment (UE), for deriving a physical layer security key from common sidelink information;
- means for determining second level shared information, that is shared between the apparatus and the UE, for deriving the physical layer security key from the common sidelink information; and
- means for communicating with the UE using the physical layer security key derived from the common sidelink information based at least in part on the first level shared information and the second level shared information.

* * * * *